(12) United States Patent
Agarwal et al.

(10) Patent No.: US 9,113,352 B2
(45) Date of Patent: Aug. 18, 2015

(54) HETEROGENEOUS SELF-ORGANIZING NETWORK FOR ACCESS AND BACKHAUL

(71) Applicant: Parallel Wireless Inc., Nashua, NH (US)

(72) Inventors: Kaitki Agarwal, Westford, MA (US); Rajesh Kumar Mishra, Westford, MA (US); Sridhar Donepudi, Nashua, NH (US); Steven Paul Papa, Windham, NH (US); Murali Talluri, Shirley, MA (US); Sumit Garg, Hudson, NH (US); Pradeep Kumar Dakshayani Raghavan, Hudson, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 14/024,717

(22) Filed: Sep. 12, 2013

(65) Prior Publication Data

US 2014/0092765 A1    Apr. 3, 2014

Related U.S. Application Data

(60) Provisional application No. 61/705,440, filed on Sep. 25, 2012, provisional application No. 61/718,503, filed on Oct. 25, 2012, provisional application No. 61/725,865, filed on Nov. 13, 2012, provisional (Continued)

(51) Int. Cl.
*H04W 24/02* (2009.01)
*H04W 84/18* (2009.01)

(52) U.S. Cl.
CPC .............. *H04W 24/02* (2013.01); *H04W 84/18* (2013.01)

(58) Field of Classification Search
CPC .. H04W 24/02; H04W 84/18; H04W 36/0094
See application file for complete search history.

(56) References Cited

U.S. PATENT DOCUMENTS

| | | | |
|---|---|---|---|
| 2005/0152305 A1* | 7/2005 | Ji et al. ......................... | 370/328 |
| 2005/0180356 A1* | 8/2005 | Gillies et al. .................. | 370/329 |
| 2009/0312022 A1 | 12/2009 | Viorel et al. | |
| 2010/0232318 A1 | 9/2010 | Sarkar | |
| 2011/0053601 A1 | 3/2011 | Frederiksen et al. | |
| 2011/0116382 A1* | 5/2011 | McCann et al. .............. | 370/241 |

(Continued)

FOREIGN PATENT DOCUMENTS

| | | |
|---|---|---|
| EP | 2453691 A1 | 5/2012 |
| EP | 2503815 A1 | 9/2012 |

(Continued)

*Primary Examiner* — Jae Y Lee
(74) *Attorney, Agent, or Firm* — Michael Y. Saji; Anne-Marie Dinius

(57) ABSTRACT

This application discloses methods for creating self-organizing networks implemented on heterogeneous mesh networks. The self-organizing networks can include a computing cloud component coupled to the heterogeneous mesh network. In the methods and computer-readable mediums disclosed herein, a processor receives an environmental condition for a mesh network. The processor may have measured the environmental condition, or it could have received it from elsewhere, e.g., internally stored information, a neighboring node, a server located in a computing cloud, a network element, user equipment ("UE"), and the like. After receiving the environmental condition, the processor evaluates it and determines whether an operational parameter within the mesh network should change to better optimize network performance.

13 Claims, 14 Drawing Sheets

Related U.S. Application Data application No. 61/729,158, filed on Nov. 21, 2012, provisional application No. 61/729,489, filed on Nov. 23, 2012, provisional application No. 61/783,193, filed on Mar. 14, 2013, provisional application No. 61/784,002, filed on Mar. 14, 2013.

(56) References Cited

U.S. PATENT DOCUMENTS

| | | |
|---|---|---|
| 2012/0142347 A1 | 6/2012 | Morad et al. |
| 2012/0236731 A1 | 9/2012 | Beaudin |
| 2012/0264470 A1 | 10/2012 | Bajj et al. |
| 2012/0307697 A1 | 12/2012 | Mukhopadhyay |
| 2013/0003654 A1 | 1/2013 | Iyer et al. |
| 2013/0017796 A1* | 1/2013 | Milner et al. ............. 455/67.13 |
| 2013/0078945 A1 | 3/2013 | Lavi et al. |
| 2013/0294403 A1 | 11/2013 | Srinivasan |
| 2013/0331114 A1* | 12/2013 | Gormley et al. ........... 455/452.1 |
| 2014/0126474 A1* | 5/2014 | Eriksson et al. .............. 370/328 |

FOREIGN PATENT DOCUMENTS

| | | |
|---|---|---|
| WO | WO2010132884 A1 | 11/2010 |
| WO | WO 2011/034941 A1 | 3/2011 |
| WO | WO2012152306 A1 | 11/2012 |

* cited by examiner

HETEROGENEOUS SELF-ORGANIZING NETWORK FOR ACCESS AND BACKHAUL

CROSS-REFERENCE TO RELATED APPLICATIONS

This application claims the benefit under 35 U.S.C. §119 of U.S. Provisional Patent Application No. 61/705,440, entitled "Multi-Access and Backhaul Wireless Systems and Methods" filed on Sep. 25, 2012; and U.S. Provisional Patent Application No. 61/718,503 entitled "Software Defined Networking Approach for Wireless Base Station with Backhaul," filed on Oct. 25, 2012; and U.S. Provisional Patent Application No. 61/725,865 entitled "Novel method of location based PCI selection in radio networks," filed on Nov. 13, 2012; and U.S. Provisional Patent Application No. 61/729,158 entitled "Dynamic Frequency Selection Using SON, UE Location and Power Information," filed on Nov. 21, 2012; and U.S. Provisional Patent Application No. 61/729,489, entitled "Dynamic Discovery of Uni-Cloud Node by Uni-Ran," filed on Nov. 23, 2012; and U.S. Provisional Patent Application No. 61/783,193 entitled "Automatic Access and Backhaul Role Switch for Networking Resources," filed on Mar. 14, 2013; and U.S. Provisional Patent Application No. 61/784, 002 entitled "Method of Dynamically Altering Operational Parameters of a Base Station," filed on Mar. 14, 2013, each of which is hereby incorporated by reference in its entirety. In addition, U.S. Provisional Patent Application No. 61/793, 351, entitled "Start Up Sequence and Configuration for Radio Node," filed on Mar. 15, 2013, is also hereby incorporated by reference in its entirety.

FIELD

The present application relates to systems and methods of performing self-organizing techniques in mesh communication networks. The self-organizing network ("SON") modules disclosed herein have the ability to self-optimize, self-heal, or self-configure a wireless, mesh communication network.

BACKGROUND

The total capital expenditures required to keep pace with consumer demands being placed on wireless communication networks is increasing significantly. As wireless networks become more complex and more ubiquitous, the costs associated with establishing, provisioning, and maintaining these networks continues to rise. One of the reasons these costs continue to rise is the high level of skill required to establish, manage, and maintain these networks. From the nascent stages of network design through the more mundane tasks of ensuring operability, highly skilled individuals play significant roles in the continued functioning of our wireless networks.

Recently, wireless communication providers have begun to automate some of the tasks associated with network provisioning and maintenance using SON techniques that self-configure, self-optimize, and self-heal. SON solutions are primarily being implemented in either the LTE access portion of eNodeBs, or within a central management node, but not on the backhaul portion of the eNodeBs. An eNodeB is the combined radio interface and radio network controller in an LTE station.

These prior implementations have drawbacks because, for example, when SON techniques occur only at the eNodeB level, each eNodeB has a limited view of the entire network. In most networks, an eNodeB does not see network operational parameters and environmental conditions external to itself. As a result, eNodeBs are typically limited in their ability to make dynamic operational changes. Similarly, when a central management node implements SON techniques, the typical flow involves a network management node asking an operations management node if any of the eNodeBs under its operational control are experiencing interference. In order to answer that question, the operational management node queries the eNodeBs under its control. Once it has received all of the responses from each of the eNodeBs under its management, it compiles these data and makes a determination about whether it should instruct any of the eNodeBs to change operational parameters.

The types of SON implementations currently being employed are primarily focused on auto-provisioning and interference mitigation. In current deployments, network resources such as Wi-Fi and 3G/4G antennas and Ethernet links are configured as either access or backhaul. Generally, that role persists for the life of the product. If a SON module could be used to make these roles more dynamic, networks could be more flexible and could provision themselves on-the-fly so as to overcome network isolation and maximize network efficiency.

In another example, if a certain portion of a frequency band has a transmit power restriction placed upon it, network operators typically do not use that portion of the band because it is challenging to create different power profiles for certain sub-channels or sub-carrier frequencies. Restrictions are typically placed on a portion of a frequency band to avoid interference. These restrictions can be e.g., adding a buffer zone, creating a guard band, and the like. The frequency-band nature of electronic components makes it difficult to control the power of certain sub-carrier frequencies, or sub-channels, within the band using static electronic components. If, however, SON techniques could be applied to this scenario, it would be possible to obtain more capacity out of frequency bands having restrictions.

While the concept of SON is clearly an attractive one given its ability to reduce costs and resolution time of issues when they arise in the network, there is a need to apply the principles of SON to a wider array of wireless communication protocols, frequency ranges, access and backhaul, and the like. Similarly, it is desirable to design SON modules that can integrate these disparate technologies, protocols, network pathways and the like by leveraging the strengths of each within a particular network in a hybridized fashion, and on a real-time basis. In addition, in a mesh network, where nodes are more autonomous than in traditional networks, adding SON capabilities to the mesh topology would enhance the performance of these networks as well.

SUMMARY OF THE INVENTION

This application discloses self-organizing network embodiments that can be implemented in heterogeneous mesh networks or in a white-space mesh network. In the embodiments described herein, a processor receives an environmental condition for a mesh network. The processor may have measured the environmental condition, or it could have received it from elsewhere, e.g., internally stored information, a neighboring node, a server located in a computing cloud, a network element, user equipment ("UE"), and the like. After receiving the environmental condition, the processor evaluates it and determines whether an operational parameter within the mesh network should be change to optimize network performance.

BRIEF DESCRIPTION OF THE DRAWINGS

FIGS. 9A-G illustrate a SON module directed toward real-locating spectrum.

DETAILED DESCRIPTION

Figure 1:
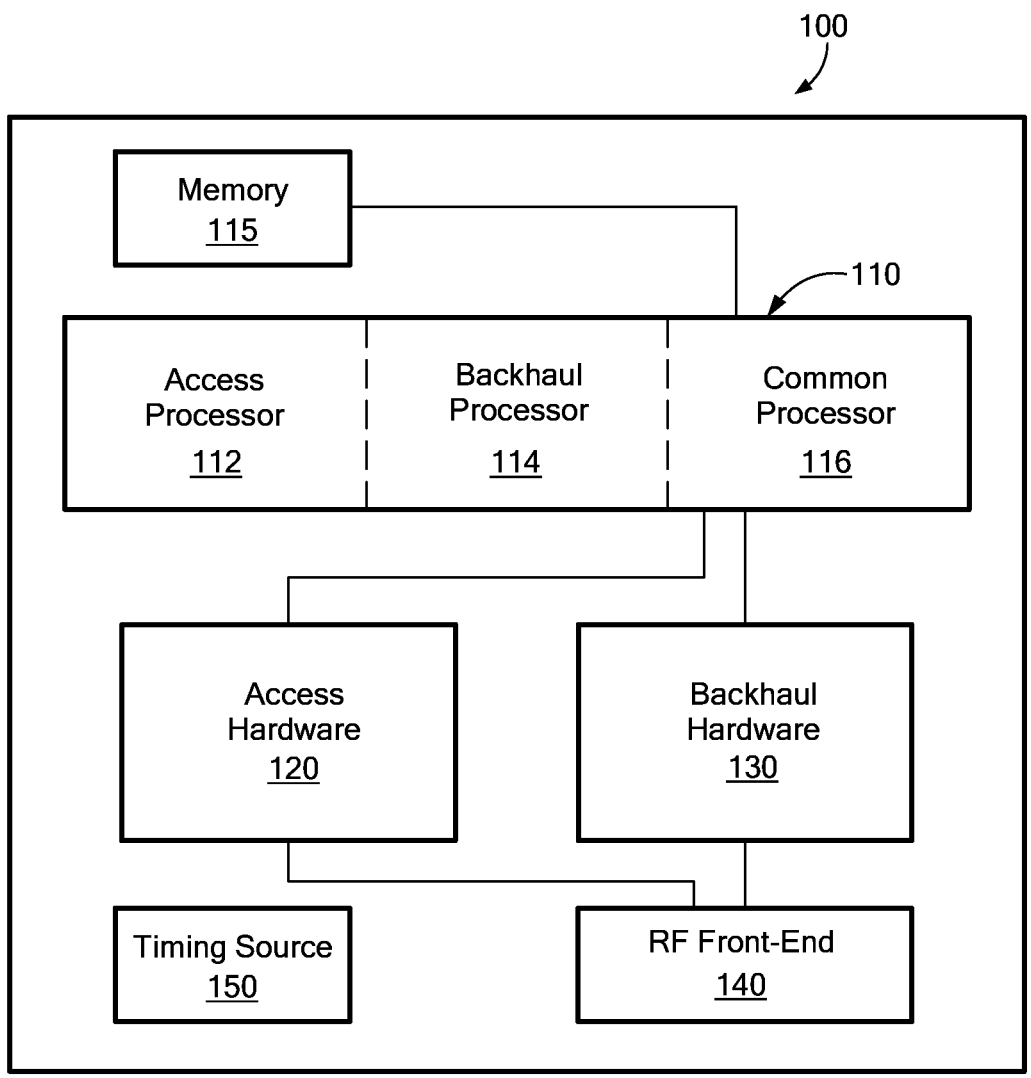
FIG. 1 is an illustration of an example multi-RAT node for deployment within a mesh network.

The systems and methods disclosed herein can be used with heterogeneous mesh networks. Although mesh networks have been deployed in the past, these networks have not contained nodes capable of autonomously using SON techniques, nor have they contained nodes capable of working jointly with a computing cloud component. Before discussing the specifics of the architecture, we will provide some background information on the mesh networks within which our SON modules will operate. The mesh networks of the present invention are capable of: (1) operating on white-space frequencies; (2) dynamically switching roles; (3) autonomously using SON techniques; (4) operating within a heterogeneous environment; and (5) using layered SON modules in conjunction with a computing cloud or a software defined network server.

The mesh networks of this invention differ conceptually from prior art gateway paradigms because the custom designed layer stacks of this invention abstract the protocols that make each radio technology unique, thereby creating an agnostic data set that can be seamlessly routed throughout a wireless network. In embodiments of this invention, individual nodes operating on different protocols, different frequencies, different hardware manifestations, or different duplexing schemes can be part of a dynamic mesh network because of the aforementioned abstraction. This dynamic mesh network uses a single routing table for heterogeneous nodes contained within the mesh network.

Mesh Networks

The term "mesh network" is typically defined as a network comprised of two or more nodes wherein the nodes act as routers. Illustratively, an online encyclopedia from PC Magazine defines a mesh network as follows: "(1) [a] network that relies on all nodes to propagate signals. Although the wireless signal may start at some base station (access point) attached to a wired network, a wireless mesh network extends the transmission distance by relaying the signal from one computer to another . . . (2) A network that provides Wi-Fi connectivity within an urban or suburban environment. It comprises 'mesh routers,' which are a combination base station (access point) and router in one device. Also called 'mesh nodes,' they are typically installed on street light poles, from which they obtain their power." PC Mag.com Encyclopedia, www.pcmag.com/encyclopedia/term/54776/wireless-mesh-network Similarly, another online source states: mesh "networks rely on a series of nodes that transfer data wirelessly. Each node acts as an individual router, so the network can constantly reroute data to take advantage of the best pathways. It allows information to 'hop' from one node to another, circumventing blocked or broken paths in the network. Unlike other wireless networks, mesh networks use nodes that are all fully connected to one another, so the nodes are not mobile, but they can be easily configured to form ad hoc networks." Power Source Online, *Mesh Networks*, Kristin Masters March 2010. www.powersourceonline.com/magazine/2010/03/mesh-networks As used in this application, we define the term "dynamic mesh node" as a mesh node that is capable of playing a dynamic role within a network. A dynamic role could mean, by way of example, being capable of being a client with respect to one node and a server with respect to another node in the network, or instantly switching from a client role to a server role. Dynamic can also mean switching radio access technologies. Prior art mesh nodes did not have the ability to play a dynamic role within a network. Rather, they acted as a base station access point and router. These roles were predetermined. The nodes within the mesh networks did not dynamically function as a client to one node, and a server to another, nor did they dynamically change transmit frequencies or protocols, for example.

Multiple Radio Access Technology ("Multi-RAT") Nodes

The concept of multiple radio access technology will also be defined. The term "radio access technology" indicates the type of radio technology used to access a core network. Multiple radio access technology, or multi-RAT, is a radio technology capable of operating in varying parameters. These varying radio parameters could be, for example, different protocols, different duplexing schemes, different media access methods, disparate frequency bands, and the like. The multi-RAT nodes, upon which SON embodiments operate are dynamic mesh nodes.

By disparate frequency bands, we mean frequencies from different categories of standards, or from generally accepted frequency ranges for a given technology. For example, the Wi-Fi protocol standard is currently authorized for use at two different frequencies in the United States, 5 GHz according to the 802.1a standard and 2.4 GHz according to the 802.1b standard. However, the message format, media access method, etc. are identical regardless of the frequency used. Thus, in our lexicography, a device that could communicate using Wi-Fi at both 5 GHz and 2.4 GHz would not be a multi-RAT device or node because both of these frequencies are considered within the art to represent instances of the Wi-Fi protocol. An example of a radio capable of operating in disparate frequency bands would be a radio that could operate in a Wi-Fi band of either 2.4 GHz or 5 GHz and that same radio could also operate at 700 MHz or any other cellular frequency band, which requires a different media access method and/or a different message format. This type of a radio is an example of a multi-RAT node.

Similarly, we use the term "heterogeneous mesh network" to mean at least two dynamic mesh nodes capable of: using different access protocols, or different duplexing schemes, or operating in disparate frequency bands, or using different transport media, such as wired versus wireless. Different protocols may include Wi-Fi, 2G, 3G, 4G, WCDMA, LTE, LTE Advanced, ZigBee, or Bluetooth. Different duplexing schemes may include time division, code division, and frequency division schemes. Disparate frequency bands may include so-called "whitespace" VHF and UHF channels, cellular telephony bands, public safety bands, and the like.

The SON modules disclosed herein were designed to operate in multi-RAT nodes and/or on a computing cloud. These embodiments perform self-optimization, self-organization, and self-healing on both the access and backhaul sides of the network. The multi-RAT nodes of the present invention have hardware, firmware, and software aspects. Focusing on the multi-RAT nodes, FIG. 1 shows hardware that could be used in embodiments of this invention. A multi-RAT node 100 is comprised of at least one processor 110, a memory device 115, access hardware 120, backhaul hardware 130, an RF front-end 140, and a timing source 150. By way of example, the memory device 115 could contain SON modules, which could be written in Linux. Additionally, the RF front-end 140 can be configured to provide RF capabilities for multiple radio access technologies.

In one embodiment, the timing source could be GPS. Alternatively, the timing source could be derived from the Ethernet, or an IEEE 1588 source, such as SyncE, PTP/1588v2, and the like. In an alternate embodiment, wherein one multi-RAT node 100 may have access to GPS time, but another multi-RAT node 100 may be indoors, the two multi-RAT nodes 100 could use differential time synching techniques well known to those of skill in the art, so that the indoor multi-RAT node 100 could sync its timing with that of the outdoor multi-RAT node 100. In another embodiment, the multi-RAT node 100 could be a dynamic multi-RAT node.

In alternate embodiments, the processor 110, could be broken down into an access processor 112, a backhaul processor 114, a common processor 116, or any combination thereof. Each additional processor would also be coupled to the memory device 115. In this embodiment, the access hardware 120 is coupled to the processor 110. In an alternate embodiment, having a separate access processor 112, the access hardware 120 could be coupled to the access processor 112, to the processor 110, or to the common processor 116, or any combination thereof. Similarly, in another alternate embodiment, having a separate backhaul processor 114, the backhaul hardware 130 could be coupled to the backhaul processor 114, to the common processor 110, or to the common processor 116, or any combination thereof.

In alternate embodiments, the SON modules could be stored on a processor or a server located within a computing cloud. In these embodiments, the SON modules stored in the computing cloud are communicatively coupled to a multi-RAT node 100 so as to effectuate a layered SON management architecture. Similarly, computing clouds could employ a layered SON architecture whereby the servers could be communicatively coupled via an XML-based interface or similar interface.

Those skilled in the art will appreciate that access and backhaul hardware will vary, depending on the access or backhaul protocol or frequency being used. By way of example, if a particular multi-RAT node 100 was designed to perform access on LTE and Wi-Fi, it could have the radio access technology components that would perform access on these two different protocols. For LTE access, the access hardware 120 could be comprised of: a baseband processor and CPU cores for the firmware. The baseband processor could generate digital RF signals, which are modulated by the RF front end 140. These processors could be connected to the RF front end 140 via common public radio interfaces. Alternatively, some or all of the necessary radio access technology may incorporate Commercial Off-the-Shelf (COTS) hardware/firmware devices, such as conventional Wi-Fi access hardware based on Wi-Fi chips with embedded firmware and one or more external antennas.

Those skilled in the art will recognize that multiple hardware configurations could be used depending upon the access protocol, backhaul protocol, duplexing scheme, or operating frequency band by adding or replacing daughter cards to the dynamic multi-RAT node 100. Presently, there are off-the-shelf radio cards that can be used for the varying radio parameters discussed herein. Accordingly, the multi-RAT nodes 100 of the present invention could be designed to contain as many radio cards as desired given the radio parameters of heterogeneous mesh networks within which the multi-RAT node 100 is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Similarly, in the present invention, we describe how to make and use the inventions operating within well-known industry protocols. To the extent that additional protocols are adopted in the future, the teachings herein would be equally applicable. Additionally, if a person of skill in the art were to modify an already known protocol, such as LTE, and make it into a proprietary LTE protocol, for example, the teachings of this patent application would be equally applicable; and embodiments described herein could be adapted to accommodate this proprietary protocol.

Software-Defined Networking ("SDN")

In the SDN architecture, the control and data planes are decoupled, network intelligence and state are logically centralized, and the underlying network infrastructure is abstracted from the applications. SDN allows network administrators to manage network services more easily through abstraction of lower level functionality into virtual services.

The SDN architecture departs from legacy solutions by building networks from three abstractions or layers. See generally "Build the Foundation for SDN with OpenFlow," HP Business White Paper, February 2013. First, the infrastructure layer acts as the foundation for an SDN architecture. The infrastructure consists of both physical and virtual network devices such as switches and routers. These devices implement the OpenFlow protocol as a standards-based method of implementing traffic forwarding rules.

Second, the control layer consists of a centralized control plane for the entire network. The control plane is decoupled from the underlying infrastructure to provide a single centralized view of the entire network. The control layer utilizes OpenFlow to communicate with the infrastructure layer. Third, the application layer consists of network services, orchestration tools, and business applications that interact with the control layer. These applications leverage open interfaces to communicate with the control layer and the network state.

At the foundation of enabling SDN is an emerging open standard called OpenFlow, which ultimately allows the network to be more responsive to business needs. OpenFlow has been in development since 2007, led by Stanford University and the University of California at Berkeley. It became a standard that is now defined by the Open Networking Foundation (ONF) since 2011. OpenFlow hides the complexity of the individual pieces of network devices. OpenFlow centralizes the control of those devices in a virtualized manner, simplifying network management.

The OpenFlow protocol uses a standardized instruction set, which means that any OpenFlow controller can send a common set of instructions to any OpenFlow-enabled switch, regardless of vendor. OpenFlow is an open-standards way of virtualizing the network. Network managers can specify different policy rules for different groups of devices and users, which create multiple virtualized networks regardless of the physical network connections. This allows network managers to customize and manage these virtualized networks to ensure proper policies such as forwarding path, QoS, and security.

In embodiments of the present invention, an SDN controller or gateway operating under the OpenFlow standard could be coupled to the heterogeneous mesh network. In these embodiments, the SDN controller would also be able to communicate with any additional OpenFlow devices within its range irrespective of whether those devices were a part of the heterogeneous mesh network.

Self-Organizing Network "SON"

Those of skill in the art will recognize that the term "SON" is a frequently used concept, but one that is devoid of a standard way of implementing the principles of self-organization that the moniker implies. As a result, SON embodies principles of self-organization, typically performed on the access side by using proprietary architecture on homogeneous networks.

In the present invention, because most of the mesh networks described herein are heterogeneous, it follows naturally that any SON implementations would be able to operate in a heterogeneous network. Against this backdrop, we use the term "SON" throughout this application to mean the traditional functionality of SON, i.e., self-organization, self-optimization, auto-configuration, self-healing, and the like, applied on a heterogeneous network, as that term is used throughout this patent application, on both the access and backhaul sides. The SON principles described herein could also be used on the white-space embodiments discussed below.

Figure 2:
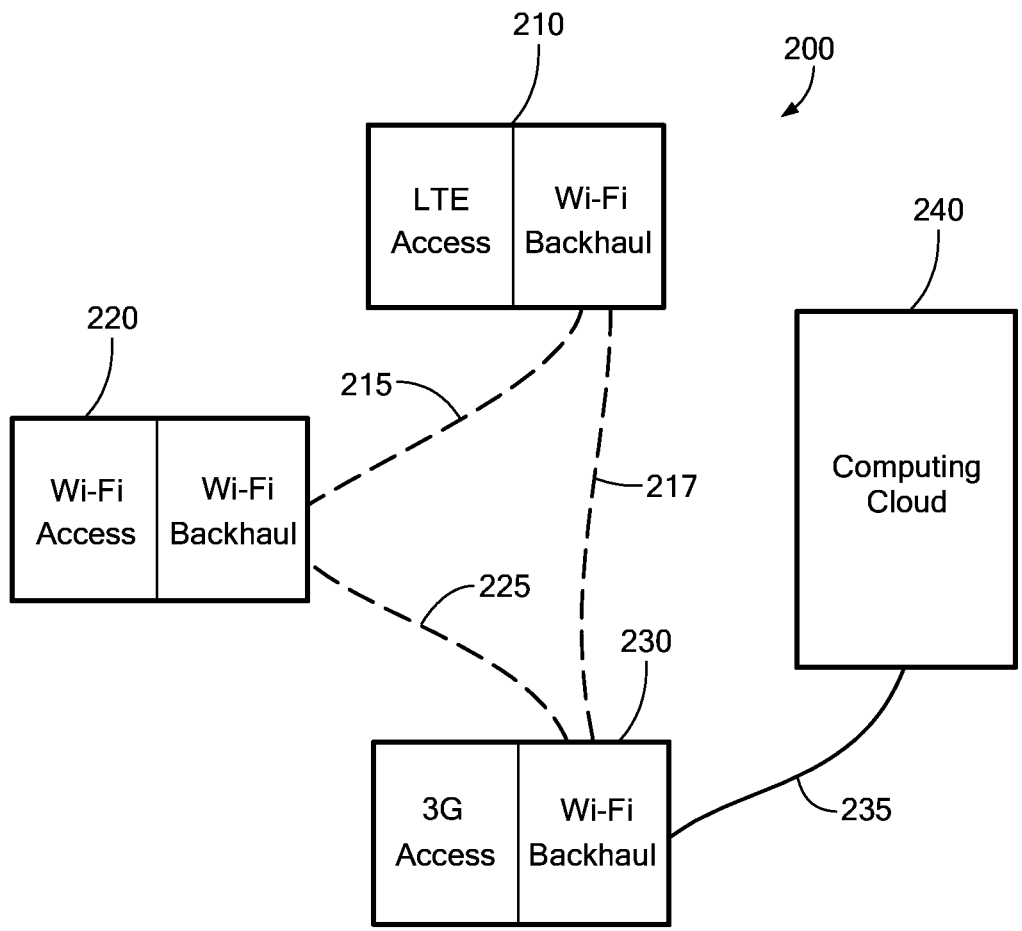
FIG. 2 is an illustration of an example heterogeneous mesh network of the present invention.

For illustrative purposes, we will describe SON functionality in an exemplary wireless mesh network 200 shown in FIG. 2. In this embodiment, multi-RAT node 210 is providing access on LTE, multi-RAT node 220 is providing access on Wi-Fi, and multi-RAT node 230 is providing access on 3G. In this embodiment, the multi-RAT nodes 210, 220, 230 could be using Wi-Fi backhaul. The wireless backhaul links, 215, 217, and 225 are shown as dashed lines, while a wired backhaul link 235 is shown as a solid line. This embodiment is one example of a heterogeneous mesh network.

Figure 3:
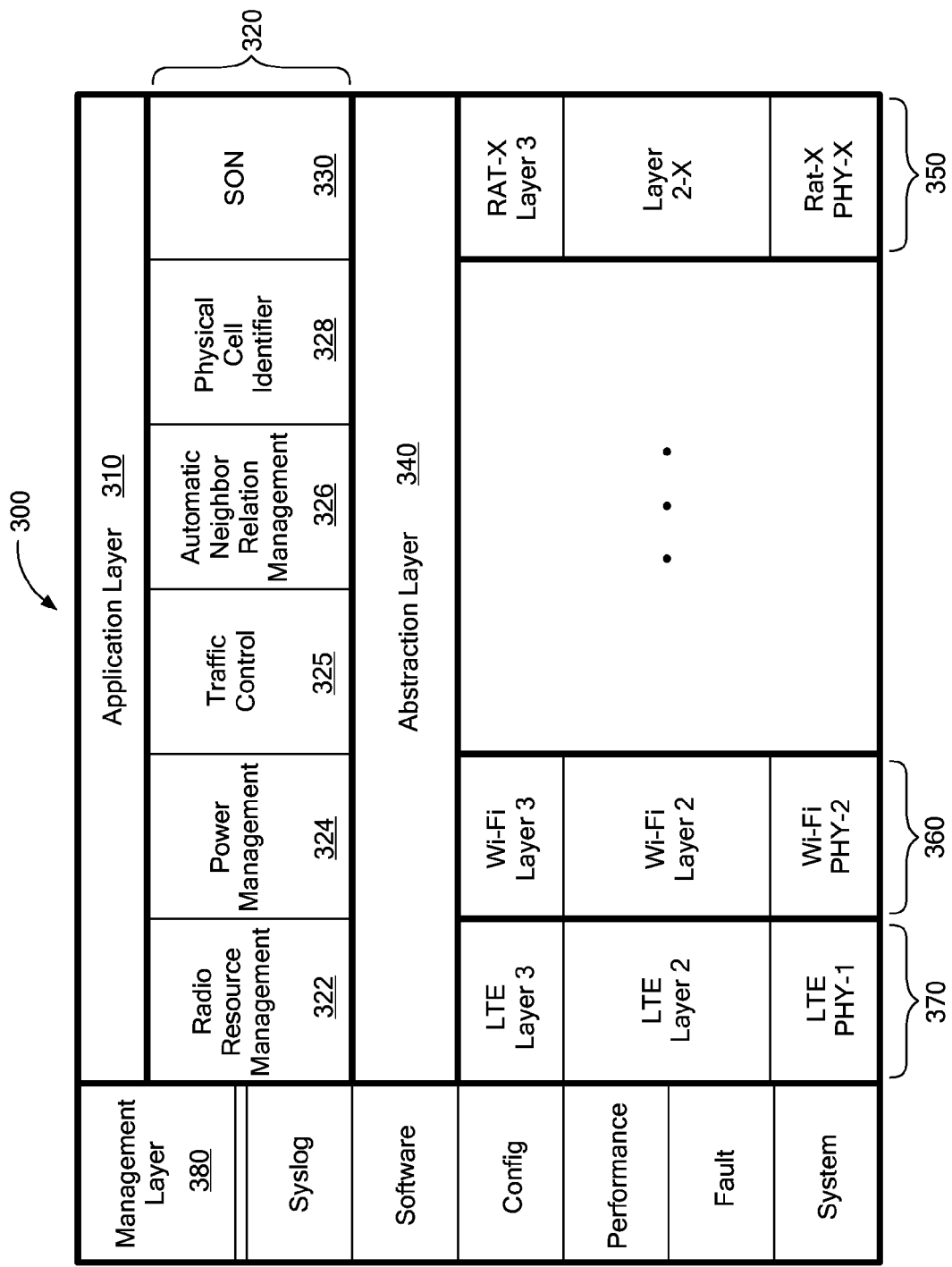
FIG. 3 is an illustration of the architecture of select layers of a device used within a mesh network described in various embodiments herein.

In some embodiments herein, the SON architecture, discussed more fully with reference to FIG. 3, is distributed between a computing cloud 240 and the multi-RAT nodes 210, 220, 230. In these hybrid SON embodiments, the SON modules located in the computing cloud 240 have a high-level view of the network, comprised of multi-RAT nodes 210, 220, and 230. This high-level view allows the SON embodiments of this invention to make larger scale, intelligent decisions by leveraging the strengths and weaknesses of the various radio technologies available within a network at any given time. Additional embodiments include multi-layered SON modules wherein a first layer of SON modules, residing within a multi-RAT node 210, 220, or 230 could be managed by a SON module located within a computing cloud 240, which in-turn could be managed by another SON module located on a network server, on an alternate cloud, or the like. In this layered topology, there could be an interface between servers such as an XML-based interface.

FIG. 3 shows a custom designed architecture 300 that can be used in embodiments of the present invention. Specifically, the custom designed architecture 300 of these embodiments builds upon the well-known Layer 1 (Physical Layer), Layer 2 (Datalink), Layer 3 (Network Layer), Layer 4 (Transport Layer), Layer 5 (Application Layer), Control Plane or Layer, and Management Plane or Layer architecture of the prior art. This custom designed architecture resides within multi-RAT nodes and computing cloud embodiments of the present invention.

In our custom designed architecture 300, we add an abstraction layer 340, a SON module 330, and in addition add customizations to the other modules so that they can interoperate with the abstraction layer 340 and the SON module 330. Specifically, our custom designed architecture 300 includes a management layer 380, an application layer 310, a control layer 320, and an abstraction layer 340. The abstraction layer 340 is communicatively coupled to at least one radio. For example, the embodiment of FIG. 3, which could be operational on a multi-RAT node of the present invention, shows three multi access technology radios. One of these radios is an LTE radio 370. One is a Wi-Fi radio 360. And the third is radio technology X 350 which as one example and without limitation could be a point-to-point microwave radio link. Once there are at least two radio access technologies within a single node, the node becomes a multi-RAT node as described herein. As can be seen from FIG. 3, additional radios 350 could be added to create multi-RAT nodes having X number of access technologies.

The abstraction layer 340 provides a common API interface to the layers above it. The abstraction layer 340 receives data from each of the radios beneath it and converts those data into protocol agnostic data. In some embodiments, the SON module 330 interfaces with complimentary SON modules stored on a server, processor, or the like, in a computing cloud 240 in order to perform network optimization.

In terms of customization of the modules within the control layer 320, the traffic control module 325 has the flexibility to create data queues based on priority without regard to radio access technology. The automatic neighbor relation management module 326 acts as an interface between the multiple radio access technologies so that neighbors within a particular mesh network become aware of the various resources provided by each node within the network.

In some embodiments, the power management module 324 and/or the radio resource management module 322 can interface with the SON module 330 to increase or decrease power, to change channels, and the like in order to optimize network operating conditions. The changes are performed on a real-time or near real-time basis, which substantially enhances network performance.

For illustration, assume that the custom designed architecture 300 was operational on a multi-RAT node having two radio technologies, LTE 370 and Wi-Fi 360. In this embodiment, data could be received through the LTE radio 370. These data would be received in Layer 1 of the LTE radio 370. They would proceed up through Layer 2 and Layer 3 to the abstraction layer 340. The abstraction layer 340 could abstract the LTE-specific information from the data packet and could send a protocol agnostic data stream to the control layer 320. The control layer 320 could then decide the routing, which in this case could be through either the LTE radio 370 or the Wi-Fi radio 360. In embodiments of the present invention, multi-RAT nodes use and create distributed routing protocols that perform L2 bridging through an abstraction layer 340.

From a high level perspective, when embodiments of the SON modules are run on processors, they perform steps that measure an environmental condition, store the environmental condition in memory, evaluate the environmental condition, and determine whether an operational parameter should be altered based upon the environmental condition. If the SON module is being run exclusively at the multi-RAT level, hardware within the multi-RAT node will perform these method steps. For example, if the environmental condition is a signal strength measurement of a neighboring node, the receiver within the multi-RAT node can measure the signal strength of its neighbor.

If the SON module is being executed from within a computing cloud, the SON module in the computing cloud could obtain the measurement of an environmental condition either from a multi-RAT node within a network it is managing, from internal stored memory, or by querying additional network elements to which the computing cloud is communicatively coupled. For example, if the environmental condition is a quality of service measurement, the computing cloud could obtain that information from the EPC (Evolved Packet Core).

It is well known in the art that certain systemic conditions affect network performance. We refer to these conditions as "environmental conditions." While we have listed many of the environmental conditions that affect network performance, this list is not meant to be exhaustive, but merely illustrative of what those skilled in the art understand regarding the effect of environmental conditions on network performance.

At various points in time, mesh networks can include multi-RAT nodes, user equipment communicatively coupled to multi-RAT nodes, and/or a computing cloud. From the network's perspective, therefore, environmental conditions and operational parameters exist for all of these participants within the mesh network.

In some embodiments, multi-RAT nodes have hybrid SON functionality, which provides intelligence gleaned by measuring, determining, or evaluating an environmental condition. In alternate embodiments, SON modules within a computing cloud operate from a higher network perspective, providing SON functionality for the network, which includes multi-RAT nodes having access and backhaul capabilities. In yet alternate embodiments, these SON modules can work together in a layered fashion. For example, a partial operation data cache could be maintained in a multi-RAT node's hardware, while the next level of SON functionality could be provided by modules located within a computing cloud. In still alternate embodiments of SON modules, SON modules located on a computing cloud server could act as an umbrella macro by managing multiple small cells underneath it, while simultaneously being managed by SON modules located on another server at a macro-network level.

Figure 4:
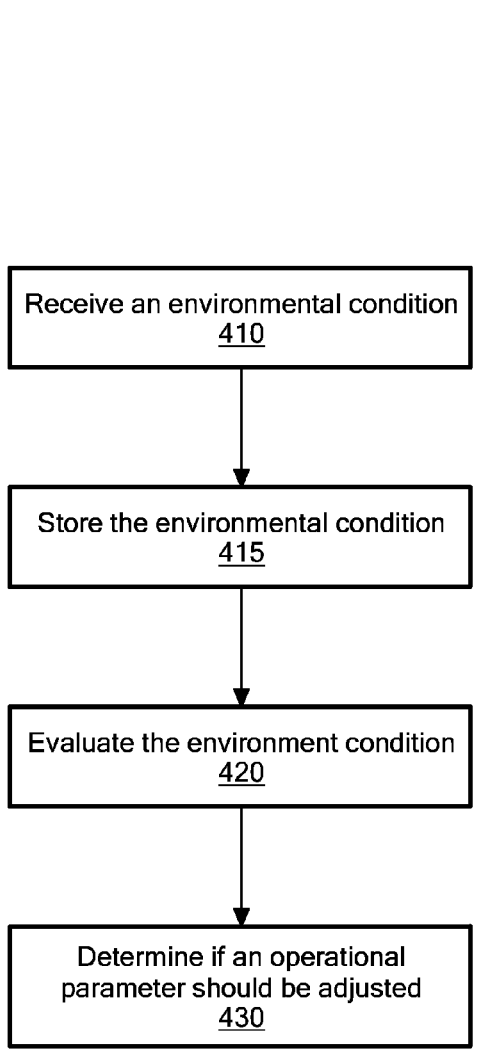
FIG. 4 illustrates the steps of embodiments of SON modules disclosed herein.

FIG. 4 illustrates the general steps of embodiments of SON modules described herein, namely receiving 410 an environmental condition, storing 415 the environmental condition, evaluating 420 the environmental condition, determining 430 if an operational parameter should be changed, and changing 435 the environmental condition. These general steps are performed for numerous embodiments irrespective of whether the processor containing the SON module that is being executed is located in a multi-RAT node 210, 220, 230 or on a server located in a computing cloud 240. If the SON module is located on a server in a computing cloud 240 it may measure an environmental condition by querying a multi-RAT node 210m 220, 230, an EPC, or the like as discussed previously.

Some of the environmental conditions regarding a heterogeneous mesh network include: an interference measurement, a capacity measurement, a spectrum efficiency measurement, routing path, a network congestion measurement, a throughput measurement, a latency measurement, a coverage gap, a signal-to-noise ratio, a quality-of-service measurement, a radio-bearer utilization value, an available portion of spectrum, a load balancing measurement, status of an operating heterogeneous mesh network, status of a multi-RAT node within the heterogeneous mesh network, identifying information regarding a multi-RAT node, status of a wired connection within the heterogeneous mesh network, a frequency restriction, a signal strength measurement of neighboring multi-RAT node, a request to join the heterogeneous mesh network, or the existence of a hidden node, and the like.

In an alternate embodiment, the SON modules described herein could be harmonized with an external third-party network having its own set of environmental conditions and operational parameters. These third-party environmental conditions or third-party operational parameters could be any of the environmental conditions or operational parameters described herein with respect to the SON network. In these embodiments, an XML-based interface could facilitate communication between a computing cloud server or a multi-RAT node containing SON modules described herein and the third party network. When the SON module receives a third-party environmental condition or a third-party operational parameter, such as an operating frequency, it can adjust an operational parameter within its own internal network, for example, by altering the operating frequency of a multi-RAT node that may be experiencing interference related to its proximity to the third-party network. The harmonization between the SON networks described herein and third-party networks could serve to greater utilize resources between both the SON networks and the third-party networks by, for example, mitigating interference, coordinating handoffs, sharing unused spectrum, and the like.

Environmental conditions specific to multi-RAT nodes include: a multi-RAT node identification number, an identification number for software stored in a multi-RAT node, a security parameter, a location of a multi-RAT node, a configuration certificate of a multi-RAT node, an authentication request, an operating frequency, or a handoff request, and the like.

Environmental conditions relating to specific user equipment being serviced by multi-RAT nodes can also be measured and relayed to multi-RAT nodes within the mesh network. Some of these environmental conditions, which could also be processed by the disclosed SON embodiments, include: a range from a user equipment to a multi-RAT node, travel direction of a user equipment, a travel speed of a user equipment, a signal strength of a user equipment, a location of a user equipment, or a mapping application stored on a user equipment, an operational channel, and the like.

The aforementioned environmental conditions could be measured by a multi-RAT node 210, 220, 230. They could be calculated within a processor on a multi-RAT node 210, 220, 230 or in a computing cloud 240. Similarly, they could be stored in cached memory within a multi-RAT node 210, 220, 230 or in a computing cloud 240.

The operational parameters that can be adjusted include: power level, channel, sub-channel, frequency band, sub-carrier frequency, spectrum allocation, access configuration, backhaul configuration, client, server, routing path, IP address, self-configuration instance, fully qualified domain name ("FQDN"), dynamic host configuration protocol ("DHCP") address, backhaul configuration, network provider (e.g., AT&T, Verizon, T-Mobile, and the like), participation within a mesh network, and the like.

After executing the steps depicted in FIG. 4, embodiments of SON modules disclosed herein could alter a panoply of operational parameters to automatically enhance network performance. By way of example, and without limiting the scope of the claims, SON module embodiments could perform the following functions: (1) node provisioning; (2) network optimization by changing an operational parameter; (3) switching roles from access to backhaul; (4) reallocating underutilized spectrum within a network; (5) coordinating handoffs; (6) using white-space frequencies; (7) utilizing frequency bands when limitations have been placed on that band; (8) deciding whether to connect to a small cell; (9) authenticating new nodes by using a client-server authentication; and (10) solving the "hidden node" problem.

(1) Node Provisioning

In some embodiments, nodes can be pre-provisioned in such a way that installing a new network could be accomplished using SON modules, as opposed to using manual provisioning techniques as is currently done. Embodiments of this invention, can be used by various network providers in myriad geographic locations even though the configuration files may be slightly different based upon the identity of the network operator or the geographic location of the mesh network. The SON functionality modules that provide node provisioning can automatically provision new equipment with the proper configuration files that take into account the network operator and the geographic location of the mesh network. In addition, these SON modules can dynamically discover and connect to a computing cloud 240.

In embodiments having this SON module, multi-RAT nodes could come out of the factory having a minimum configuration file stored in internal memory as well as the initial software necessary to operate as a mesh node in the heterogeneous mesh networks disclosed herein. The minimum configuration file could include, for example, a node ID, a pre-configured FQDN, licensing information, security parameters, such as certificates, and backhaul configuration information. These new nodes could be programmed with configuration data related to geographic location and network provider information by employing a SON module embodiment. In this embodiment, a multi-RAT node could have a radio discovery module, which allows it to identify and communication with other radio nodes that are within range, and a configuration download module that installs the remaining configuration parameters based upon the location at which the node is intended to operate. A further embodiment may provide configuration information sufficient for the multi-RAT node to communicate with its peers using only unlicensed frequencies, allowing it to then obtain further configuration information including location-dependent licensing information. This configuration download module could, by way of example, determine the geographic location of the node through GPS, location reports from other radios within range, pre-set information, or the like.

In this embodiment, the new node could have preset factory default configurations stored in an internal memory. The SON module that enables these embodiments follows the general method steps outlined with reference to FIG. 4. Specifically, after the node has been powered up, it could receive 410 and store 415 an environmental condition, such as whether it detects an existing mesh network, identifying information regarding nodes, signal strength of neighboring nodes, and the like. These measurements could be made by the receiving hardware in the multi-RAT node. After receiving 410 and storing 415 an environmental condition, the SON module embodiments could, using a processor within the multi-RAT node, evaluate 420 the environmental condition and determine 430 if an operational parameter should be adjusted. Examples of operational parameters that could be adjusted in this embodiment are IP address, FQDN for a management module stored on a computing cloud using a configured or discovered DNS server, and the like. It is possible to perform the steps of this embodiment more than once in order to provision a new small cell or network.

Focusing on changing an FQDN, this embodiment of the present SON invention allows a multi-RAT node 210, 220, or 230 to optimize its selection of a computing cloud 240 with which to connect. Specifically, it is desirable for a multi-RAT node 210, 220, or 230 to connect to the closest computing cloud 240 it can find because the closer the computing cloud 240, the less latency in the network. In this embodiment, a multi-RAT node 210, 220, or 230 could receive 410 an environmental condition, such as its location, from either an internal GPS, location reports from other radios within range, preset information, and the like. After the multi-RAT node 210, 220, or 230 receives 410 location information, it could store 415 that information in internal memory, if it is not already stored there such is in the case of preset location information.

Once the multi-RAT node 210, 220, or 230 has determined its location, it can evaluate 420, based on its location, to which computing cloud 240 it should connect. The evaluation 420 could occur as follows: (1) the multi-RAT node 210, 220, or 230 can form an FQDN with its location embedded within it; (2) it can then query a DNS server to determine if there is a computing cloud 240 serving its area; (3) the multi-RAT node 210, 220, or 230 can go through DNS procedures such as NAPTR to create a list of candidate computing clouds 240 to which it could connect; (4) the multi-RAT node 210, 220, or 230 could then match its initial FQDN against the host names associated with the candidate computing cloud 240 to select the longest match, i.e., the number of matching labels in the host FQDN; and (5) the multi-RAT node 210, 220, or 230 can authenticate the computing cloud 240 with the longest match. Once these steps are performed, the multi-RAT node 210, 220, or 230 can determine 430 if it should change an operational parameter, such as an FQDN. If it determines 430 that it should change its FQDN, it can then change 435 the FQDN.

In alternate embodiments, if there are more than one optimal computing cloud 240 to which a multi-RAT node 210, 220, or 230 could connect, the multi-RAT node 210, 220, or 230 could contain additional SON functionality that would allow it to consider additional load balancing among the two or more optimal computing clouds 240. Similarly, if the multi-RAT node 210, 220, or 230 is unable to connect with its first choice for a computing cloud 240, it can elect to try to connect with the second best candidate computing cloud 240 from the list described above.

In an alternate embodiment, the multi-RAT node 210, 220, or 230 could store information related to computing cloud 240 to which it was unable to connect. This "blacklist" could be used by any multi-RAT node 210, 220, or 230 within the network that is evaluating 410 its location in order to determine 430 its FQDN. Once a computing cloud 240 has been placed on the blacklist, it could be removed as a viable computing cloud candidate for a certain period of time, called a dead interval. The dead interval could be determined in a number of ways. It could be a predetermined time interval. It could be derived using an exponential back-off mechanism whereby the more failures from that candidate computing cloud 240, the longer the node is blacklisted. In an alternate embodiment, a multi-RAT node 210, 220, or 230 could perform periodic out-of-band signaling with the blacklisted computing cloud 240 to determine if it is reachable and functioning properly. In an alternate embodiment, the out-of-band communications could be combined with the exponential back-off method to create a heuristics-based approach.

In order to make the radio network more flexible from the deployment point-of-view, it may be desirable to introduce a node discovery mechanism that allows multi-RAT nodes to discover network elements as they are plugged in. This node discovery module capability could be part of the SON module embodiments described herein with respect to node provisioning. Optionally, the node discovery capability could be used to locate a network node that has a wired backhaul link FIG. 5 shows the steps of a node discovery SON module of this embodiment.

Figure 5:
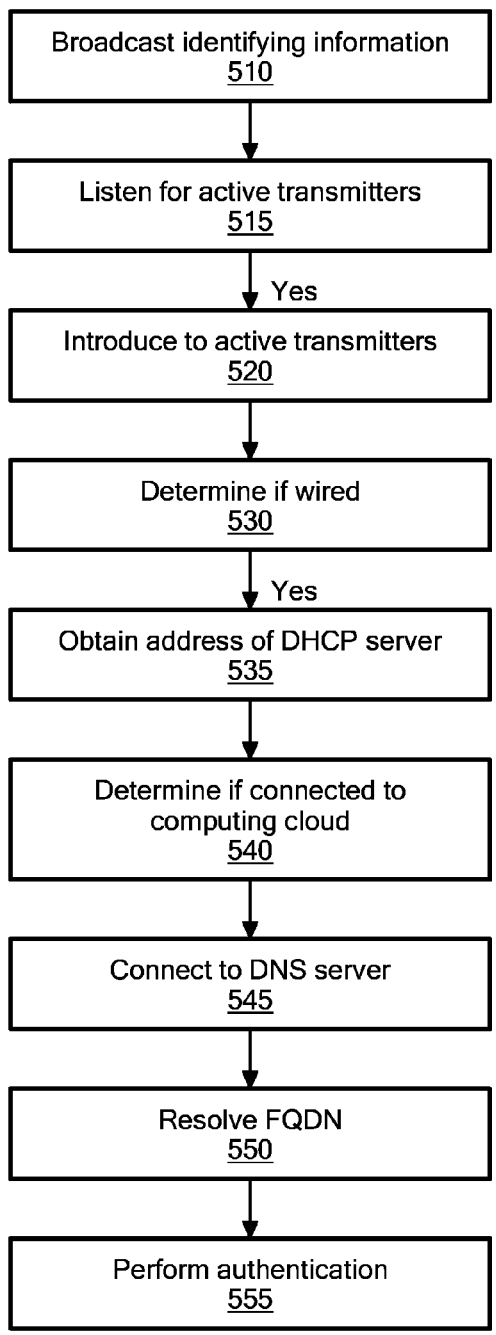
FIG. 5 is an illustration of a method of performing a network provisioning module.

Referring to FIG. 5, a new multi-RAT node could broadcast 510 identifying information, such as its node ID, on Layer 1. In addition, the new multi-RAT node could scan to see if it can locate additional nodes. In this step, the new node's receiving equipment listens 515 for active transmitters in order to determine if there are other nodes within its range or neighborhood. Each node within a network could broadcast, e.g., on control time slots, its one-hop neighbors. Nodes that receive these broadcasts use this information to build an interference domain table, database, or similar data compilation.

If the new multi-RAT node finds an additional node, it can introduce 520 itself and can also send information regarding neighboring nodes it has discovered during the scanning step. The new node could determine 530 if the additional node has a wired backhaul link. If the additional node does not have a wired backhaul link, the new node could continue listening 515 to see if it can discover a node that does have a wired backhaul link. If the additional node does have a wired backhaul link, the new node could obtain 635 the address of the dynamic host configuration protocol ("DHCP") server from the wired node.

In one embodiment, the wired node within this newly formed mesh network could be connected to a computing cloud 240, which may have SON management modules stored therewith. In this embodiment, the new node could determine 540 if the wired node is connected to a computing cloud 240. If the wired node is connected to a computing cloud 240, the new node could connect 545 to the DNS Server and resolve 550 the FQDN of the cloud component 240. In this embodiment, the new node could perform 555 authentication steps, e.g., identification credentials, software version information, and the like, with the SON management modules stored on the cloud component 240. The management module could authorize the new node for participation within the mesh network after, for example, authenticating its credentials. Additionally, the management module on the computing cloud could ensure that the software resident on the new node is the proper release version in order to allow the new node to participate within the mesh network. If it is not, the management module could provide the new node with the proper software and could instruct the new node to reboot. If the software on the new node is current, it can join the mesh network.

In an alternate embodiment, a SON module could execute a method for integrating a new multi-RAT node into a pre-existing heterogeneous mesh network. This embodiment follows the general method steps depicted in FIG. 4. Specifically, after the node has been powered up, it could receive 410 and store 415 an environmental condition, such as whether it detects an existing mesh network, identifying information regarding nodes, signal strength of neighboring nodes, and the like. These measurements could be made by the receiving hardware in the multi-RAT node. After receiving 410 and storing 415 an environmental condition, the SON module embodiments could, using a processor within the multi-RAT node 210, 220, or 230, evaluate 420 the environmental condition, determine 430 if an operational parameter should be adjusted, and change the operational parameter 435 if needed.

Figure 6:
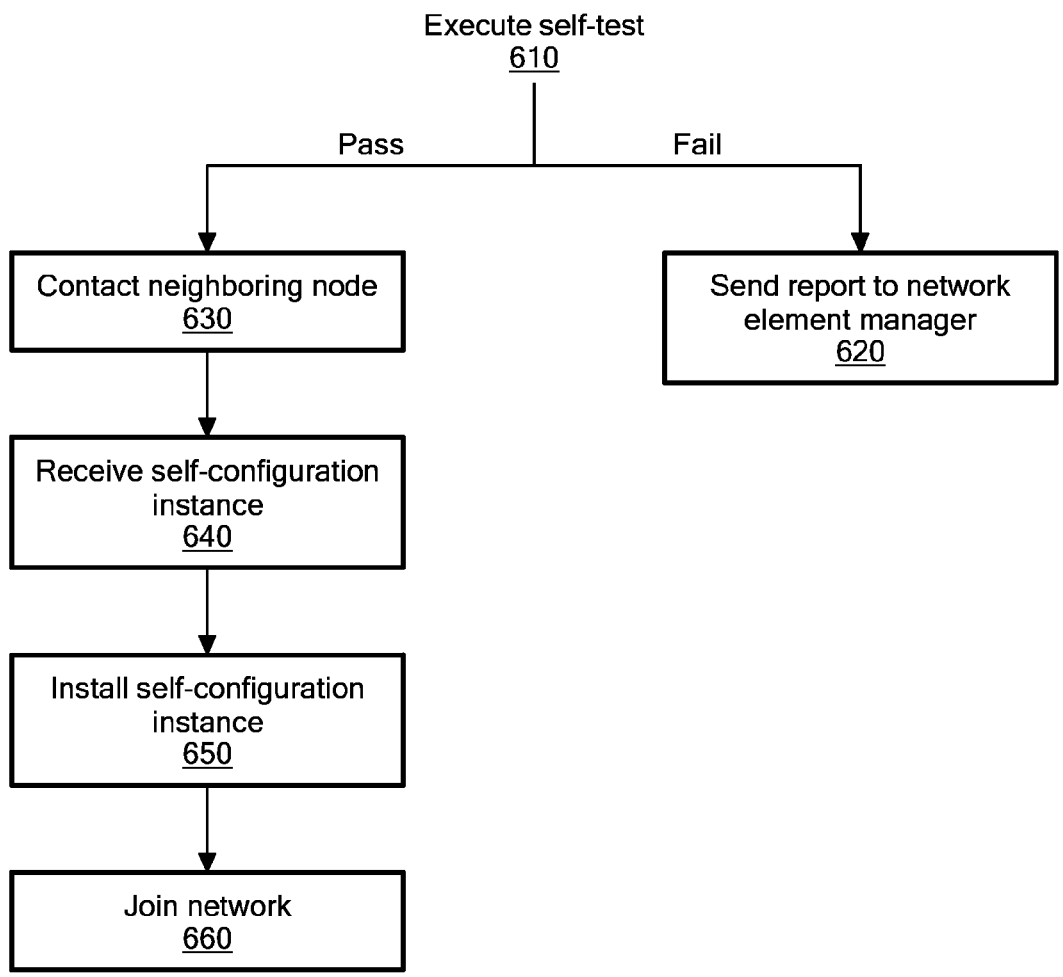
FIG. 6 is an illustration of a method for provisioning a new multi-RAT node within a pre-existing heterogeneous mesh network.

In this embodiment, the new multi-RAT node 210, 220, or 230 may not have pre-configuration data stored within its internal memory. At some point after the receiving hardware within the new multi-RAT node 210, 220, or 230 has detected a mesh network within its range, its internal logic could automatically begin taking steps so that the multi-RAT node 210, 220, or 230 could join the mesh network. Referring to FIG. 6, a SON module in this embodiment could execute 610 a self-test by running software stored within an internal processor in the multi-RAT node 210, 220, or 230. If the multi-RAT node 210, 220, or 230 fails the self-test, it could send 620 a report to a Network Element Manager. If it passes the self-test, it contacts 630 a neighboring node, which may or may not have a connection to a computing cloud.

In order for the new node to join the mesh network, it must obtain a certain amount of information from its neighboring node, or optionally from a computing cloud 240 or an SDN controller 810. In one embodiment, the new node could receive 640 a self-configuration instance, such as configuration certificates, from its neighboring node, from a computing cloud 240, or from an SDN controller 810.

Figure 7:
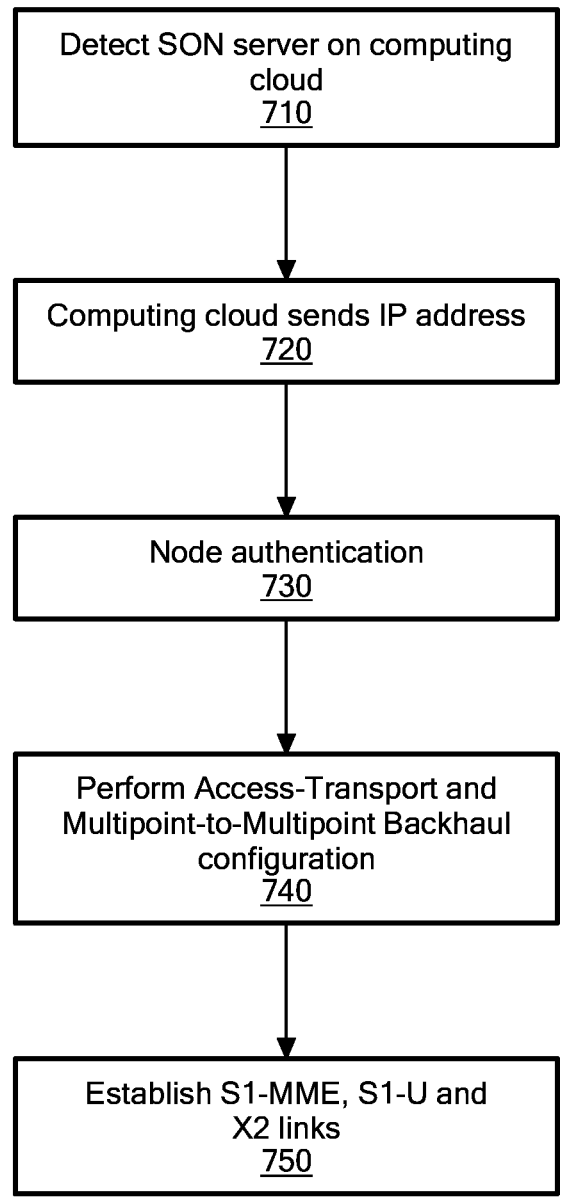
FIG. 7 is an illustration of a method of self-configuring a multi-RAT node.

After the multi-RAT node 210, 220, or 230 receives 640 the self-configuration instance, it installs 650 the self-configuration instance and joins 660 the mesh network. The Network Element Manager and the Planning Tool can inform neighboring multi-RAT nodes 210, 220, or 230 about the new multi-RAT node 210, 220, or 230 that has joined the mesh network. This new multi-RAT node 210, 220, or 230 will then be included in the neighborhood list. Optionally, a test call could be sent from a computing cloud 240, from a neighboring node, or from the PSTN to the new multi-RAT node 210, 220, or 230 to ensure proper configuration. In another embodiment, additional parameters could be derived from default values from auto-optimization and sent to the Network Element Manager and Planning Tool An alternate method of self-configuring a multi-RAT node 210, 220, or 230 is shown in FIG. 7. When a multi-RAT node 210, 220, or 230 enters a mesh network, its internal architecture detects 710 a SON module, which in this embodiment could be stored on a computing cloud 240. The new multi-RAT node 210, 220, or 230 may detect the SON server if it was located on a computing cloud 240 by making a backhaul connection with a multi-RAT node 210, 220, or 230 that is already a part of the mesh network. This multi-RAT node 210, 220, or 230 could in turn be connected to a computing cloud 240.

After this connection is established, the computing cloud 240 could sends 720 an IP address to the new multi-RAT node 210, 220, or 230. The new multi-RAT node 210, 220, or 230 could then connect to the computing cloud so that the computing cloud 240 could authenticate 730 the multi-RAT node 210, 220, or 230. In an alternate embodiment, an SDN controller 810 could authenticate 730 the multi-RAT node 210, 220, or 230. Optionally, the new multi-RAT node 210, 220, or 230 could download configuration data or any additional software it may need in order to effectively participate in the mesh network from the computing cloud 240 or the SDN controller 810. In alternative embodiments, the new multi-RAT node 210, 220, or 230 could obtain additional software from other multi-RAT nodes 210, 220, or 230 within the mesh network.

The next step in this embodiment is for the new multi-RAT node 210, 220, or 230 to perform 740 Access Transport and Multipoint-to-Multipoint Backhaul configuration. One way the new node could do this is to create a connection to a neighboring multi-RAT node 210, 220, or 230, which in turn is connected to an OAM. Once this connection has been made, the neighboring multi-RAT node 210, 220, or 230, the OAM, a computing cloud 240, or an SDN controller 810 could send configuration data to the new node. This configuration data could be pre-configured information, configuration data to replace a malfunctioning node within the network, new configuration data suitable for participation within the network, and the like.

Finally, the new multi-RAT node 210, 220, or 230 establishes 750 S1-MME, S1-U and X2 links with a computing cloud. At this point, the new multi-RAT node 210, 220, or 230 is fully integrated into the mesh network. As such, the OAM, the SDN controller 810, and dependent nodes, e.g., MMEs and other multi-RAT nodes 210, 220, or 230, are notified that the new multi-RAT node 210, 220, or 230 is ready to perform the next required operation.

When a new node comes on, if there is no "wired" connection, the SON modules can instruct that node to forego turning on access radios, such as LTE access, Wi-Fi access and so forth, until the network has established a wired backhaul connection. Those skilled in the art will recognize that a wired connection could mean an actual wire connection, such as copper, a fiber optic connection, and the like, or a microwave link Once a wired backhaul connection has been established, the SON modules will relay this information to nodes within the network so that they can activate access. In that way, the mesh network will have ensured that it has a connection to the core network.

(2) Network Optimization by Changing an Operational Parameter

With reference to FIG. 4, alternate embodiments could comprise a computing cloud 240 instructing at least one multi-RAT node 210, 220, or 230 to receive 410 at least one environmental condition chosen from the aforementioned groups. Those of skill in the art will recognize that these environmental conditions are known to affect network performance. As such, the list we provided previously of environmental conditions at the network level, at the multi-RAT node level, and at the UE level is intended to be comprehensive without being limiting. In the embodiments of this section, the methods disclosed herein follow the steps depicted in FIG. 4. The environmental condition and operating parameters can vary, but the method steps remain consistent.

The multi-RAT node 210, 220, or 230 may have an environmental condition already stored 415 in internal memory, or it may optionally measure 405 the environmental condition using its receiving hardware. Once it has made the determination, it could send the environmental condition to a SON module located in one embodiment in a computing cloud 240. The SON module within the computing cloud 240 could store 415 the environmental condition and then evaluate 420 the environmental condition, for example, in light of other information that it possesses regarding the current state of the network. After evaluating 420 the environmental condition, the computing cloud 240 could determine 430 whether a multi-RAT node 210, 220, or 230 within the network should change an operational parameter, e.g., power level, channel, sub-channel, frequency band, sub-carrier frequency, spectrum allocation, access configuration, backhaul configuration, client, server, routing path, IP address, fully qualified domain name ("FQDN"), dynamic host configuration protocol ("DHCP") address, network provider (e.g., AT&T, Verizon, T-Mobile, and the like), participation within a heterogeneous mesh network, and the like. If the computing cloud 240 determines 430 that an operational parameter should be changed, it could instruct 435 a multi-RAT node 210, 220, or 230 within the mesh network to change an operational parameter.

In an alternate embodiment, the multi-RAT node 210, 220, or 230 within a mesh network could include a SON module for performing the aforementioned steps. The steps described above could be performed by a single multi-RAT node or by two or more nodes acting in concert. In one of these embodiments, for example, a SON module within a multi-RAT node 210, 220, or 230 could include programming that instructs the multi-RAT node 210, 220, or 230 to measure 405 an environmental condition. After the node has received 410 the environmental condition in an internal processor, it could store 415 and evaluate 420 the environmental condition. After evaluating 420 the environmental condition, the SON module could determine 430 whether to change an operational parameter.

Figure 8:
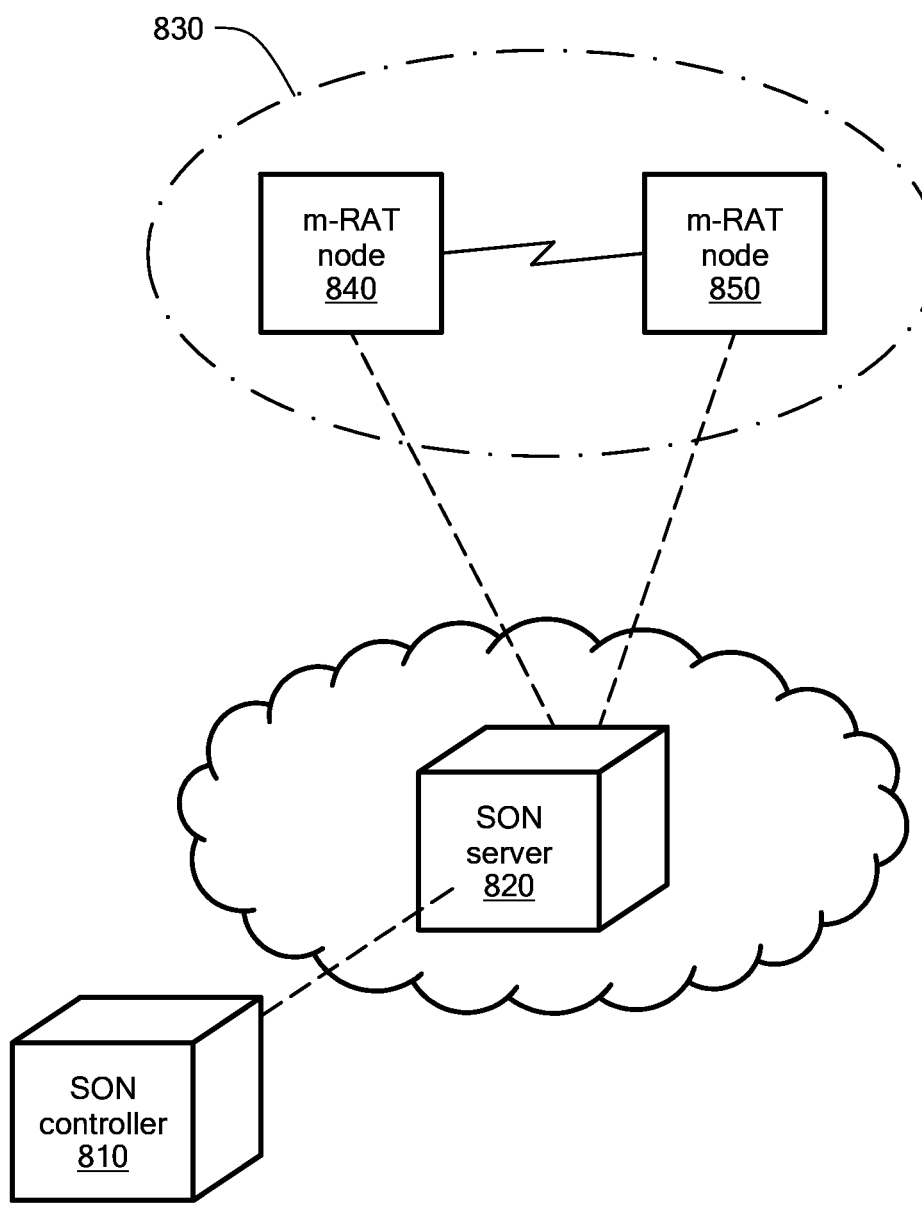
FIG. 8 is an architectural depiction of embodiments having a computing cloud component and optionally an SDN controller.

Either of these embodiments could also be communicatively coupled to an SDN controller or controller. FIG. 8 is an illustration of the architecture of this embodiment. In this embodiment, an SDN controller 810 is communicatively coupled to a SON server 820, which is part of a computing cloud 240. The computing cloud SON server 820 is in turn communicatively coupled to a heterogeneous mesh network 830 comprised of multi-RAT nodes 840 and 850.

In this embodiment, the SDN controller 810 may have information regarding quality of service, authentication, security requirements, operator policies, network polices, capacity, routing optimization, and other environmental conditions known to those skilled in the art. Based on these environmental conditions, the SDN controller 810 could instruct the SON server 820 or a SON module located within multi-RAT node 840 or 850 to alter an operational parameter. The SDN controller may issue this instruction based upon an environmental condition existing within the heterogeneous mesh network 830, or based upon information it has learned form an external source, e.g., an OpenFlow enabled device.

The multi-RAT nodes 840, 850 depicted in FIG. 8 have the same functionality, hardware, etc. as described throughout this application with respect to multi-RAT nodes 210, 220, or 230. Reference numerals are therefore interchangeable. Similarly, the embodiments described with reference to the computing cloud 240 can also be performed by the SON server 820.

In an exemplary implementation of these SON embodiments, a multi-RAT node may determine that it is approaching its capacity limit. In this embodiment, the SON module within the multi-RAT node 840 or 850 and a SON module on the SON server 820 could work together to determine if the multi-RAT node 840 or 850 should increase its capacity by reducing its output power, thereby taking advantage of spectral reuse. In this embodiment, the multi-RAT node 840 or 850 would notify the SON module in the SON server 820 that it is approaching a capacity limit. It could also request a change in operational parameter such as reduced output power.

Upon receiving this request, the SON module on the SON server 820 could, for example, evaluate radio bearer utilization, quality of service, operator policies, and capacity considerations of other nodes in the mesh network when deciding whether to grant a particular node's request to increase capacity by taking advantage of spectral reuse. In this embodiment, the SON module on the SON server 820 could inform other nodes within the network of the spectral reuse. The SON module on the SON server 820 may determine that there will be a coverage gap once the node reaching capacity reduces its power. In this situation, the SON module on the SON server 820 could address this coverage gap by orchestrating handoffs for any UE that would fall within a coverage gap. Alternatively, the SON module on the SON server 820 could instruct some nodes within the network to increase their power in load-balancing techniques well known within the art.

In another embodiment of the present invention, a SON module within a first multi-RAT node 840 or 850 may detect that a second neighboring multi-RAT node has ceased functioning properly. In this embodiment, the SON module within the first multi-RAT node 840 or 850 may determine that it should increase its power output to fill the coverage gap. This SON functionality could be performed exclusively at the multi-RAT node 840 or 850 level, or as a hybrid-SON implementation jointly between a multi-RAT node 840 or 850 and a SON module on a SON server 820 and/or an SDN controller 810. If this functionality is performed in conjunction with a computing cloud SON module on a SON server 820, the computing cloud 240 could coordinate with the functioning multi-RAT nodes 840 or 850 so that at least one of them increases power, thereby extending coverage. After the coverage area has been extended, multi-RAT nodes 840 or 850 may update the virtualization manager with the resulting radio bearer capacity reduction information. Additionally, in this embodiment, the multi-RAT node(s) 840, 850 may have to handoff UE sessions in progress gracefully to other neighboring multi-RAT nodes in order to effectively extend coverage.

In an alternate embodiment, a SON module within a multi-RAT node 840 or 850 may contain internal logic that instructs it to change an operational parameter, such as channel, if an environmental condition such as interference falls within a certain range of values, for example. In another embodiment, the environmental condition could be signal-to-noise ratio and the operational parameter could be power level.

In another embodiment, a multi-RAT node 840 or 850 may detect an environmental condition of interference from a neighboring node. One way to mitigate this interference could be to determine the interference zone between the two adjacent nodes. This determination could, for example, be made using SON modules stored on a processor in the computing cloud 240 or 820 or in a multi-RAT node 840 or 850. After the interference zone has been determined, the SON module could calculate a new output power for the two nodes who are having interference issues such that the interference would disappear. In this SON module, the computing cloud 240 or 820 or the multi-RAT node 840 or 850 performing the interference calculation could instruct the two interfering neighboring nodes to reduce their power. In addition, the SON module could create a new configuration file for the two interfering nodes to accurately reflect the new output power levels of each.

An alternate embodiment could include a mesh network having at least two-multi-RAT nodes 210, 220, or 230 with a wired connection to a computing cloud 240. In this embodiment, a SON module within a computing cloud 240 could monitor the environmental condition of network congestion. If the SON module determined that network congestion exceeded a particular performance metric, the SON module could use information contained within the routing tables to determine if it should alter the wired backhaul link it is using to transmit data to the network based upon the routing tables and where the network congestion is occurring within the mesh network. In this embodiment, an operational parameter could be the choice of which wired backhaul link should be used.

(3) Switching Roles from Access to Backhaul

In another embodiment, a SON module could instruct a multi-RAT node 210, 220, or 230 to switch its access radio to a backhaul radio and vice-versa if for example the SON module determined 430 that it was nearing a capacity threshold. This SON module is possible because of the custom architecture discussed below with respect to FIG. 3. An example implementation of this SON module could occur in a mesh network having a plurality of multi-RAT nodes 210, 220, or 230 coupled to a computing cloud 240. One of the multi-RAT nodes 210, 220, or 230 could be using a Wi-Fi radio for access and an LTE radio for backhaul. By measuring environmental conditions 405, the multi-RAT node 210, 220, or 230 or the computing cloud 240 may determine 430 that a node is experiencing a backlog on the access side, which is an environmental condition, and that it could increase its efficiency by taking advantage of the greater downlink capacity built into the LTE standard. In this situation, the SON modules within the computing cloud 240 and the multi-RAT node 210, 220, or 230 could coordinate so that the multi-RAT node 210, 220, or 230 dynamically switches an operational parameter such as switching its access to backhaul, i.e., the LTE radio in multi-RAT node 210, 220, or 230 would be used for backhaul and the Wi-Fi radio would be used for access.

In an alternate embodiment, this SON module could reside exclusively within the multi-RAT nodes 210, 220, or 230 within the mesh network. In this embodiment, a multi-RAT node 210, 220, or 230 within the network may determine 430 that it, or one of its neighbors, is experiencing a backlog, by measuring 405 an environmental condition, receiving 410 the measurement within a processor, storing 415 the measurement, and evaluating 420 the environmental condition within the mesh network. The SON module within the multi-RAT node 210, 220, or 230 could similarly make this determination based on cached information, internal measurements, distributed intelligence, routing table information, and the like. Either way, once the SON module has determined that congestion could be alleviated if a role switch was performed, the SON module could notify the congested multi-RAT node 210, 220, or 230 to perform a role switch for the embodiment where the SON module is stored in a computing cloud 240. In the embodiment where the SON modules is stored in a multi-RAT node 210, 220, or 230, the multi-RAT node 210, 220, or 230 could notify its neighbors of its intent to switch roles, and then switch roles. Alternatively, it could notify its neighbor, who is experiencing the backlog, that its neighbor should switch roles.

In yet another alternate embodiment, an SDN controller 810 could determine that the heterogeneous mesh network 830 was nearing a capacity threshold. The software within the SDN controller 810 could interact with a SON module located in a multi-RAT node 840, 850 or on a SON server 820 in a computing cloud 240 to perform the role reversal described above. More specifically, after the SDN controller 810 determined that a capacity threshold was being reached, it could pass that information to a SON module within a computing cloud 240, a multi-RAT node 840, 850, or both. Once these SON modules have this environmental condition information, they could follow the steps discussed above to determine if one of the multi-RAT nodes 840, 850 should dynamically switch its access and backhaul configurations.

(4) Reallocating Underutilized Spectrum within a Network

In additional embodiments, a SON module within a computing cloud 240 could provide additional floating spectrum to one or more multi-RAT nodes 840, 850 to alter an environmental condition such as capacity, quality of service, efficient spectrum reuse, and the like. In this embodiment, multi-RAT nodes 840, 850 may have been given a certain amount of spectrum to service UE within their range. Some of that spectrum may be underutilized. If other multi-RAT nodes within the mesh network could use the underutilized spectrum, a SON module could redistribute frequency allocations to the multi-RAT nodes 840, 850. This SON module could be resident on a server 820 within a computing cloud 240 or in a multi-RAT node 840, 850, or both. Additionally, the SON module could consider environmental conditions such as network capacity in deciding whether to change operational parameters such as frequency allocation when determining if it should reallocate underutilized spectrum.

In an alternate embodiment, a portion of dedicated spectrum could be allocated for common use. In this embodiment, a SON module resident on a computing cloud 240 and/or a multi-RAT node 210, 220, or 230 could oversee sharing of the common spectrum based on parameters such as network demand and current frequency allocation.

In alternate embodiments, an SDN controller 810 could initiate the reallocation of spectrum within a network based on information it receives from an external device, such as an OpenFlow enabled device. In this embodiment, it is possible that the device, e.g., the OpenFlow device could measure an environmental condition such as network capacity and determine that the heterogeneous mesh network could perform more efficiently if a SON module within the network reallocates some of the spectrum. The OpenFlow device could communicate this information to the SDN controller 810, which in turn could instruct a SON module located in either a computing cloud 240 or a multi-RAT node 840, 850 to perform the spectrum allocation described in this section.

Figure 9C:
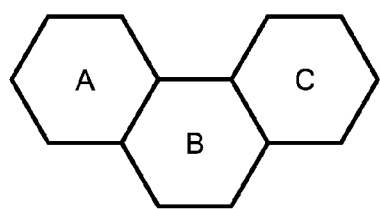
Figure 9C:
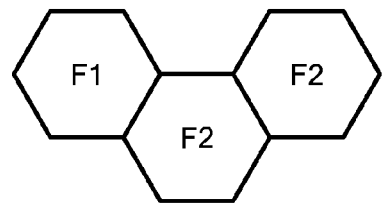
Figure 9C:
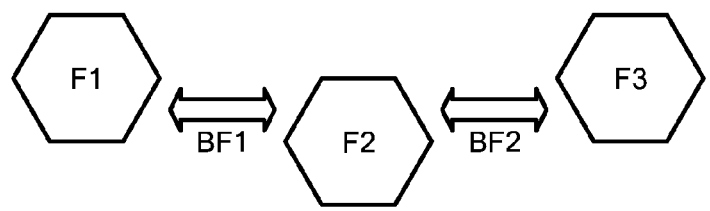

FIGS. 9A-G illustrate the concept of floating spectrum for the foregoing embodiments. This floating spectrum can be provisioned for access or backhaul and can be distributed among multi-RAT nodes 210, 220, or 230 within a heterogeneous mesh network. With reference to FIG. 9A, this exemplary network is comprised of three cell sites—A, B, and C—each being serviced by a multi-RAT node 210, 220, or 230. The access frequency allocations for each site are F1, F2, and F3, respectively as shown in FIG. 9B. Those skilled in the art will recognize that these allocations represent a spectrum of resources, e.g., frequencies in an OFDM scenario, timeslots in a TDMA scenario, and the like.

FIG. 9C depicts the backhaul links BF1 and BF2 between adjacent cells. In one embodiment, the backhaul links could be wireless, in which case BF1 and BF2 represent backhaul resources, e.g., frequencies or timeslots. Although the cell sites are shown separate from one another, this is to illustrate the backhaul links and not intended to imply that there are coverage gaps within the network. In this embodiment, frequencies F1, F2, F3 represent access technology frequencies, e.g., LTE access.

Figure 9D:
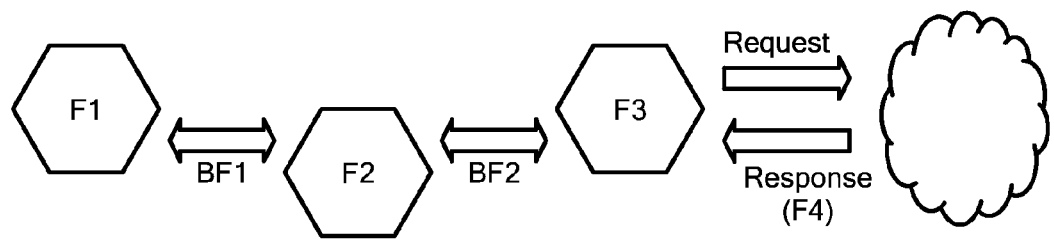
Figure 9E:
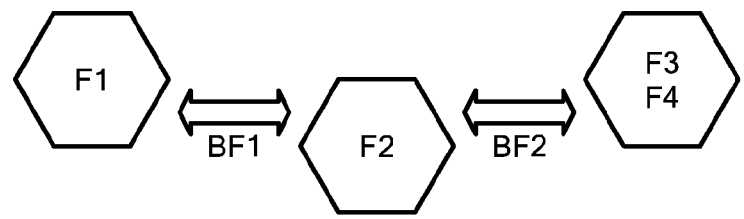

If cell site C, having a frequency allocation of F3, expects or experiences congestion, it may request "floating" resources from a computing cloud or from one or more of its neighbors. Assuming that cell site C requested additional frequency from a computing cloud 240, FIG. 9D shows the computing cloud 240 replying with a floating frequency allocation F4 that may be used by site C. As can be seen in FIG. 9E, cell site C now has additional spectrum, F3 and F4, to service its clients.

Figure 9F:
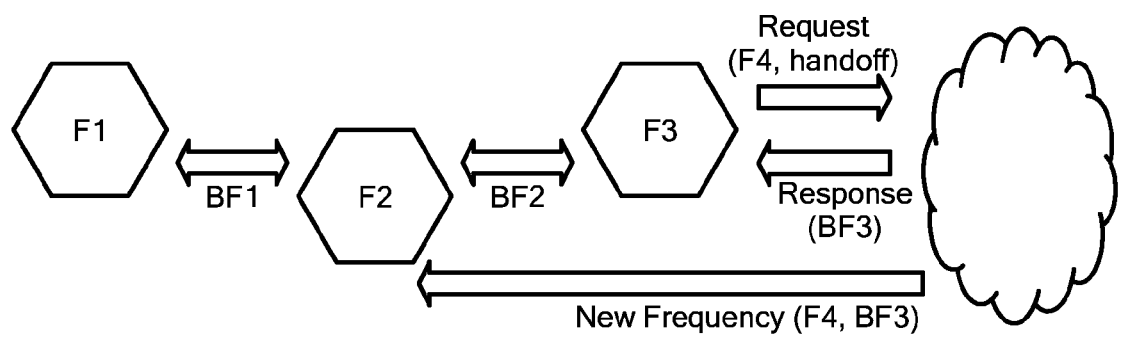

In an alternate embodiment, it is possible for subscribers to cell site C to handoff or terminate their connections in the future. In that situation, cell site C no longer requires the previously allocated floating frequency. FIG. 9F depicts this scenario. In FIG. 9F, subscribers have transferred to cell site B, which now needs additional resources to handle the increased traffic. As part of the handoff procedure, cell site C could inform the computing cloud 240, or one or more of its neighbors, about the release of the floating frequency, as well as the handoff of subscribers to cell site B.

Figure 9G:
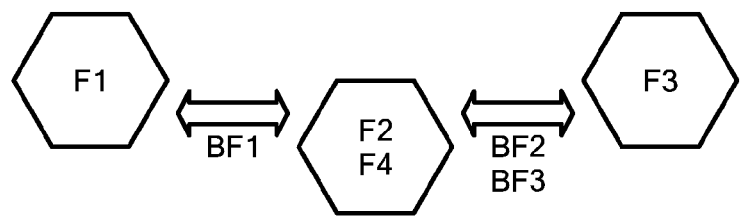

Assuming that cell site C informed a computing cloud 240 about the release of spectrum and the handoff, the computing cloud 240 could inform cell site B about the availability of floating frequency F4. In addition, the computing cloud 240 could notify cell sites B and C about an extra backhaul frequency BF3 that the two sites may use to increase throughput. FIG. 9G illustrates the state of the network after the spectrum has floated to cell site B. If necessary, cell site A is able to receive the allocation of floating spectrum F4 as well, in the same manner as described above.

In some embodiments, the above example is performed without the use of a centralized computing cloud 240. In these embodiments, multi-RAT nodes 210, 220, or 230 maintain a decentralized pool of available resources and determine amongst themselves how the resources are to be allocated.

(5) Coordinating Handoffs

In another embodiment, two multi-RAT nodes may be operating within close proximity to one another, but they may be servicing different customers, e.g., Verizon and AT&T. Referring to FIG. 2, assume multi-RAT node 210 was servicing Verizon customers and multi-RAT node 220 was servicing AT&T customers. If multi-RAT node 210 reached a predetermined capacity threshold, it could coordinate with multi-RAT node 220 to handoff some of its Verizon customers, who are operating in a different frequency band, to multi-RAT node 220. This coordination would include, for example, querying whether multi-RAT node 220 had sufficient capacity to service additional users, determining which users were within range of multi-RAT node 220 and so forth.

The SON modules within each of the multi-RAT nodes 210, 220 could orchestrate this handoff by, for example, first determining that it is advisable from a network performance standpoint, and second by executing the steps necessary to perform the handoff, including reprovisioning multi-RAT node 220 to accommodate users on a different frequency band. Multi-RAT node 220 could provide service to customers of both Verizon and AT&T on two different frequency bands. The SON modules could use an environmental condition or a plurality of environmental conditions to make this determination.

In this embodiment, once multi-RAT node 220 has been provisioned to provide services on two different frequencies, its SON module could coordinate with the SON module within multi-RAT node 210 by sharing information such as, traffic details, call details, RF quality measurements, and so forth. These nodes 210 and 220, which could be two or could be many, can add or remove frequency bands and can coordinate with each other to force user equipment handoffs to accommodate the change in the frequency scheme.

In an alternate embodiment, the computing cloud 240 could reallocate provider-specific resources to service another provider's customers. In this embodiment, the computing cloud 240 could have received 410 an environmental condition indicating that multi-RAT node 210 was nearing a capacity threshold. The computing cloud could then store 415 and evaluate 420 the environmental condition. If the computing cloud 240 determined 430 that an operational parameter, such as frequency, should be adjusted, it could instruct multi-RAT node 220 alter an operational parameter as described above.

(6) White-Space Frequencies

An alternate embodiment of the present invention could include a mesh network wherein at least one multi-RAT node 210, 220, or 230 operates over a white space frequency. As those of skill in the art will recognize, using white-space frequencies for communication requires flexibility in terms of pre-selecting or dynamically-selecting an operational frequency because these frequency bands are unlicensed. The white space frequency bands are, therefore, shared among many users.

In this embodiment, SON modules within multi-RAT nodes 210, 220, or 230 could use spectrum sensing techniques to measure 405 environmental conditions, such as the availability of unlicensed spectrum. If after receiving 410 and storing 415 the environmental condition, the SON module determines 430 that an operational parameter, e.g., available frequency, should be adjusted, it can perform the necessary provisioning within the multi-RAT node 210, 220, or 230 to enable operation over a white space frequency. In an alternate embodiment, a SON module within a multi-RAT node 210, 220, or 230 could query a database containing frequency availability based on location, time, and the like to determine 430 an available frequency band. This database could be stored within any or all of the multi-RAT nodes 210, 220, or 230 in a particular mesh network, in a computing cloud 240, on an SDN controller 810, or in a remote location. In additional embodiments, different nodes within a mesh network could use different TV white space frequencies to minimize the potential of interference. In this embodiment, the SON module that orchestrates frequency allocation for the multi-RAT nodes 210, 220, or 230 could be located in a computing cloud 240.

(7) Utilizing Frequency Bands with Limitations

In this embodiment, a SON module, resident on either a multi-RAT node 210, 220, or 230 or within a computing could 240, or both, could enable using a frequency band where the FCC has placed power limitations upon sub-carrier frequencies or sub-channels. These guard bands protect neighboring transmitters/receivers from interference. A typical guard band will prohibit high power transmission on the edge of cells upon which there may be interference. These guard bands may prohibit UEs from operating on channels near the edges of the allocated frequency band for a particular cell when that UE approaches the edge of the coverage zone for the cell. UEs located close to the edge of a coverage zone where frequency limitations are in place may be able to transmit on channels within the middle of the allocated frequency band without interfering with neighboring cells.

Figure 10:
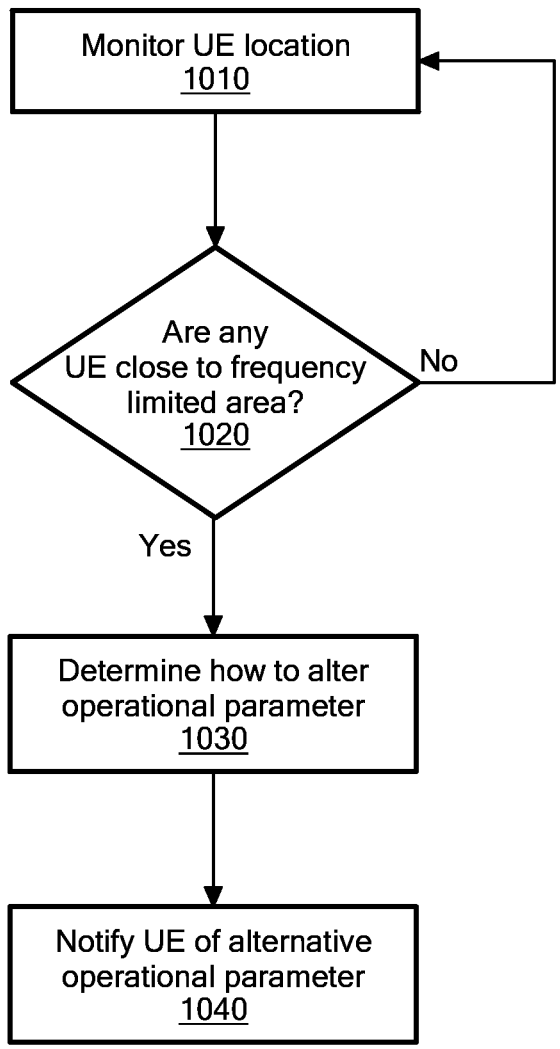
FIG. 10 illustrates a method of utilizing frequency bands within certain limitations.

This SON module, depicted in FIG. 10, could include a configuration profile, which provides details regarding frequency limitations of a given band. Once the configuration profile is enabled, meaning SON modules within the multi-RAT nodes 210, 220, or 230 and/or computing cloud 240 are aware that there are frequency limitations existing somewhere within the network's coverage area, multi-RAT nodes 210, 220, or 230 could monitor 1010 the location and/or signal strength of at least one UE.

The multi-RAT nodes 210, 220, or 230 within this network could scan the network to measure environmental conditions indicative of the neighborhood profile and interference patterns. This information could be reported to other multi-RAT nodes 210, 220, or 230 within the network, to a computing cloud 240 or to an SDN controller 810. In this embodiment, a central SON module located on a computing cloud 240 could inform individual multi-RAT nodes 210, 220, or 230 about their neighbor's cell interference patterns, as well as provide an acceptable frequency usage pattern. In alternate embodiments, a SON module located on a multi-RAT node 210, 220, or 230 could inform other nodes within the network about their neighbor's cell interference patterns, as well as provide an acceptable frequency usage pattern. Multi-RAT nodes 210, 220, or 230 can use direction/speed knowledge to anticipate future locations of the UE and pre-calculate future frequency requirements.

A SON module within a multi-RAT node 210, 220, or 230 can determine 1020 that a UE is approaching an area that is restricted in terms of its sub-frequency, sub-channel, channel, and the like. The SON module could make this determination 1020 by monitoring the UE's signal strength, its geo-location readings, and the like. Once the UE has entered an area that is restricted, the SON module could use information it knows about the frequency restrictions, which could optionally be stored in a configuration profile, to determine 1030 an appropriate change for an operational parameter, e.g., channel, sub-channel, sub-frequency carrier, and the like. The SON module could also notify 1040 the UE that it should change an operational parameter to accommodate the restrictive frequencies. Once the UE has moved outside of the restricted frequency zone, it could be handed off to a different frequency.

If a SON module within a computing cloud 240 was overseeing adherence to frequency band limitations of this embodiment, it could receive information regarding environmental conditions form multi-RAT nodes 210, 220, or 230 within the mesh network servicing the various UEs. It could store 415 this information in a processor and use this information to determine 430 if one of the multi-RAT nodes 210, 220, or 230 should change an operational parameter in order to continue to comply with the limitations placed upon the frequency band.

(8) Small Cell Connection

Another embodiment of the present invention could use direction/speed knowledge from a UE in a SON module designed to reconcile whether to connect to a small cell or stay connected to a macro cell. According to recent news, AT&T is planning to combine 3G, 4G, LTE and Wi-Fi access in its radio access small cells and to deploy 40,000 or more of the tiny base stations through 2015. While the addition of small cells adds voice capacity and enhanced data access, it also creates challenges when, for example, a "small cell battles the network for a device that is attempting to connect to the network . . . . For instance, if a user is in their car connected to the macro network, AT&T does not want that user roaming onto a small cell located in a restaurant on the street as they pull up at a stop light and then losing the connection as they drive away. "3G, 4G & Wi-Fi: AT&T Plans Small-Cell Threesome," *Light Reading Mobile*; May 9, 2013; www.lightreading.com/at-t/3g-4g—wifi-att-plans-small-cell-threesome/240154556. AT&T further noted that reconciling the choice between a small cell and a macro network is "exponentially more difficult when layering together and managing 3G, 4G, and Wi-Fi connections." Id. (emphasis in original).

Figure 11:
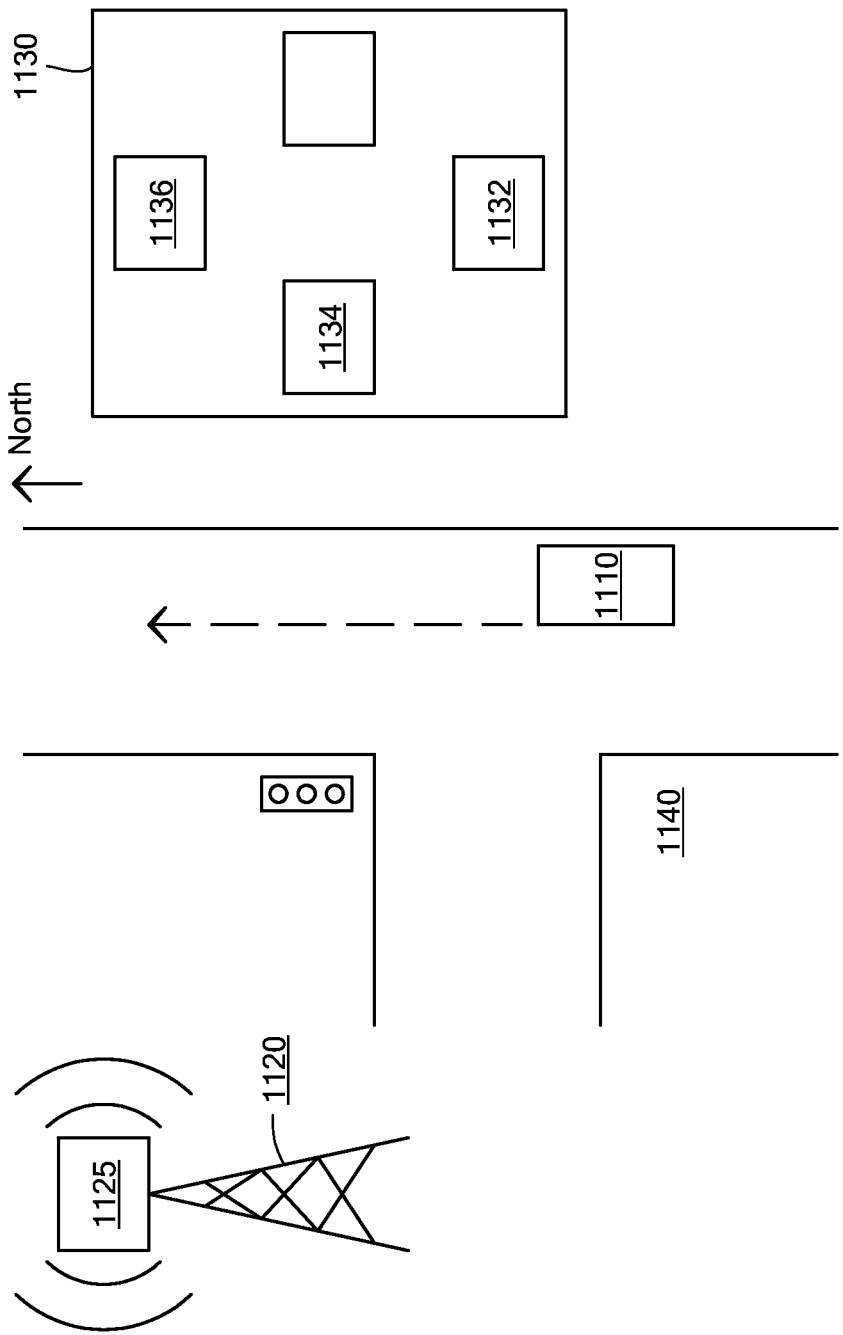
FIG. 11 illustrates a scenario where a UE is within range of a macro cell and a small cell.

In this embodiment, the difficulty of layering together and managing disparate network connections, such as 3G, 4G, and Wi-Fi is addressed by the abstraction layer 340 of the present invention, which creates network agnostic data, coupled with SON intelligence. FIG. 11 is illustrative for describing the functionality of this SON module. The SON module of this embodiment could be used when a UE 1110 could connect to both a macro network 1120 and a small cell network 1130. The macro network 1120 could be serviced by any base station, or it could be serviced by multi-RAT nodes. In this example, and without limiting the scope of the claims, we assume that the macro network 1120 is being serviced by a base station 1125.

Suppose that a UE 1110 was travelling in a car just prior to reaching an intersection 1140. The UE 1110 may have been receiving service from a base station 1125 that is part of a macro network before it reached the intersection. During the time that the UE 1110 is idle at the intersection, however, it may connect with a multi-RAT node 1132, which has the same functionality and architecture as multi-RAT nodes 210, 220, 230, 840 and 850, within a small cell mesh network 1130. This small cell mesh network 1130, for example, could be installed within a mall.

One of the environmental conditions that the UE 1110 could be measuring is signal strength from the base station 1125. If the signal strength from the small cell multi-RAT node 1134, which has the same functionality and architecture as multi-RAT nodes 210, 220, 230, 840, 850, and 1132, was stronger than that from the macro cell base station 1125 while the UE 1110 was at the intersection 1140, the UE's 1110 internal logic would automatically begin determining if it should handoff to the small cell 1130, or remain connected to the macro cell 1120.

Figure 12:
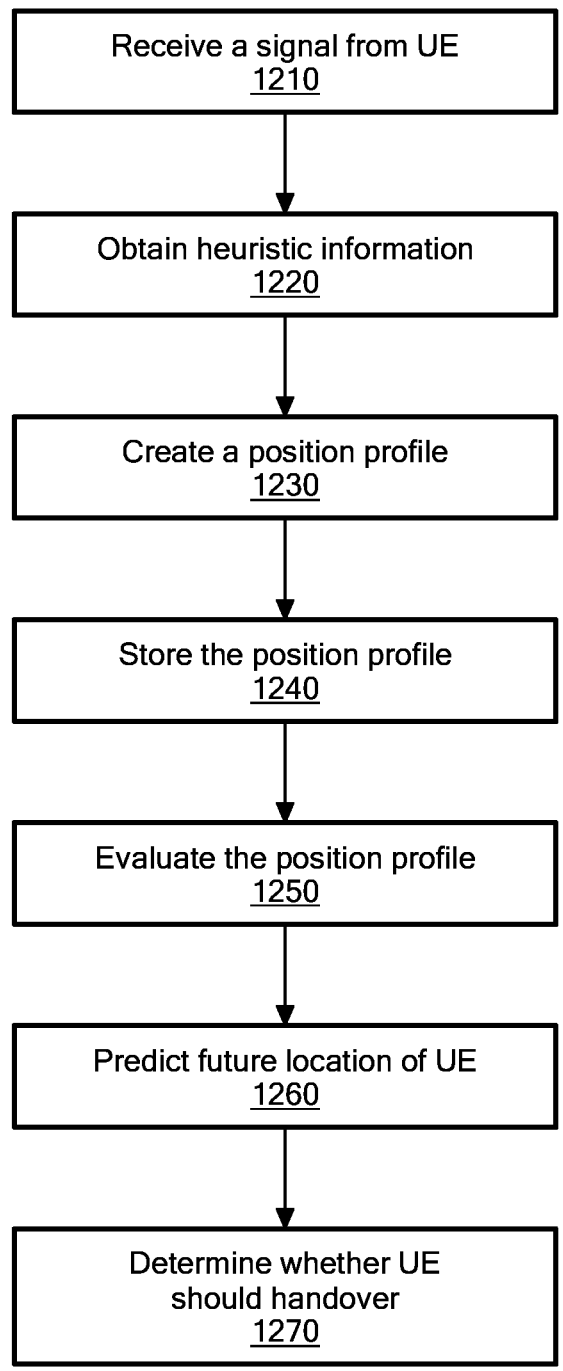
FIG. 12 illustrates a method of deciding whether a UE should remain connected to a macro cell, or should instead connect to a small cell.

Specifically, in this embodiment, the steps of which are depicted in FIG. 12, when the UE 1110 comes within range of multi-RAT node 1132, multi-RAT node 1132 would receive 1210 a signal from the UE indicating that the UE 1110 is within its range. In order to determine whether multi-RAT node 1132 should orchestrate a handover from base station 1125, it could obtain 1220 heuristic information from the UE 1110. The heuristic information could be: a distance traveled over a time T1, an average speed over a time T2, a destination stored in internal memory within the UE 1110, a speed limit measurement for a nearby road, a possible direction in which the UE 1110 could travel, a signal strength measurement for a servicing base station 1125, and a signal strength measurement for a multi-RAT node 1132, 1134, or 1136, which has the same functionality and architecture as multi-RAT nodes 210, 220, 230, 840 850, 1132, and 1134. The times T1 and T2 could vary and do not have to be equal.

At this point, the multi-RAT node 1132 could use one or more of these heuristic data to determine whether the UE 1110 should remain connected to base station 1125 or should handover to multi-RAT node 1132 or either of the other multi-RAT nodes 1134 or 1136 in the mall. A SON module stored in a processor for example could create 1230 a position profile from the heuristics. After creating 1230 a position profile, the method of this embodiment could store 1240 the position profile in internal memory within the multi-RAT node 1132 before evaluating 1250 the position profile in order to predict 1260 a future location or trajectory for the UE 1110. Once the SON module predicts 1260 a future location for the UE 1110, it can determine 1270 whether the UE should handover to multi-RAT node 1132, 1134, or 1136.

Using the position profile and optionally present metrics, the SON module could determine if it has enough information to predict 1260 a statistically sound, future location of the UE 1110 in the upcoming minutes once the UE 1110 begins moving again. While evaluating 1250, the SON module may, for example, use information regarding a final destination loaded into map navigation software to predict 1260 the future location of the UE 1110. If for example, the UE's 1110 map navigation software has the mall as its final destination, the SON module could weight its prediction accordingly. On the other hand, if the final destination is elsewhere, the SON module could use predictive models to account for the fact that the UE's 1110 owner may spontaneously stop at the mall in determining 1270 whether to create a connection between the UE 1110 and the small cell mesh network 1130. If the SON module predicts 1260 that the UE 1110 is going to continue driving northbound on the road shown in FIG. 11, it could instruct the UE 1110 to maintain its connection with the macro network 1120. If, however, the SON module predicts 1260 that the UE 1110 is instead going to be headed to the mall, it could instruct the UE 1110 and/or one of the multi-RAT nodes 1132, 1134, 1136 within the small cell mesh network 1130 to create a connection so that the UE 1110 can join the small cell mesh network.

Alternatively, the SON module may determine that it does not have enough information to predict 1260, within an acceptable range of accuracy, the future location of the UE 1110. In this instance, the small cell mesh network 1130 could continue to monitor the speed, direction, and or position of the UE 1110 for a short amount of time to enhance the accuracy of its predictive modeling. The SON module could use measurements of environmental conditions obtained after the UE 1110 begins moving away from the intersection 1140 to create heuristics that enhance its future prediction.

Assume UE 1110 was connected to multi-RAT node 1132 and that the SON module within multi-RAT node 1132 followed the steps depicted in FIG. 12 in order to determine whether the UE 1110 should remain connected to the macro network 1120 or should instead connect to the small cell mesh network 1130. If multi-RAT node 1132 was unable to make a statistically sound decision regarding the likely future position of the UE 1110, it could initiate a handoff of the UE 1110 to multi-RAT node 1134. The advantage of this handoff would be, once the UE 1110 began moving, multi-RAT node 1134 could maintain a stronger connection with it for a further distance. This would enable multi-RAT node 1134 to obtain additional current position/speed/direction information from the UE 1110. Similarly, multi-RAT node 1134 could facilitate a handoff to multi-RAT node 1136 so that additional position, direction, or speed information could be obtained.

Turning again to FIG. 12, at some point, a SON module will determine 1270 if the UE 1110 should remain connected to the macro network 1120 or connect to a multi-RAT node 1132, 1134, or 1136 within the small cell mesh network 1130 In the event that the SON module is unable to obtain enough information from the UE 1110 to determine 1270 which network is optimal, the default recommendation could be that the UE 1110 remain connected to the macro network 1120.

(9) Client-Server Authentication

This SON embodiment takes resources that already exist in a client-server scenario and uses those resources to allow a device to create a peer-to-peer relationship with an operating multi-RAT node 210, 220, or 230. In today's technology, assuming that a user desires to implement a meshed network of base stations, when a new base station enters that mesh network, it must authenticate its credentials using a peer-to-peer protocol. This type of authentication also occurs when user equipment joins a meshed network.

The difference in the protocols used under these two scenarios is, when user equipment enters a mesh network, it is joining in a master-slave or client-server scenario. This authentication is common place and cost effective from a network resources standpoint. When a base station, however, wishes to join a network, it must use peer-to-peer authentication, which is more costly from a resources standpoint. As such, it is desirable for a mesh network of base stations to be able to add base stations to the mesh network using client-server authentication procedures This embodiment uses a SON module to allow multi-RAT nodes 210, 220, or 230 to be added to a mesh network using a client-server authentication. In current deployments the role of networking resources on a multi-RAT node 210, 220, or 230 is statically defined for all practical purposes. Despite these static roles, it is physically possible for an Ethernet or Wi-Fi interface to be provisioned as backhaul. Similarly, a Wi-Fi interface can be used for access.

Figure 13:
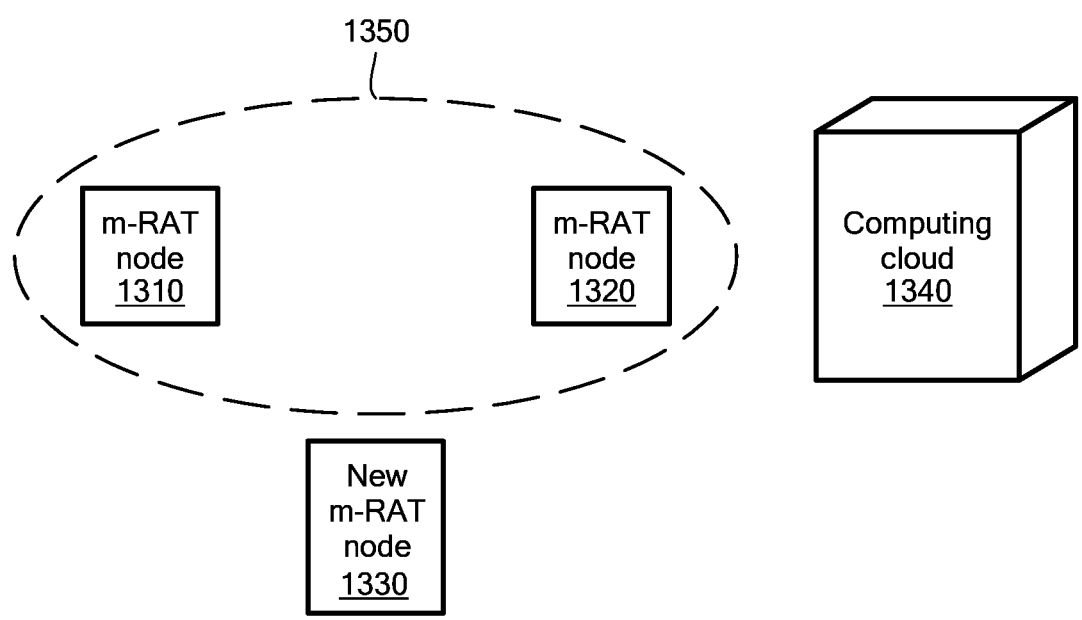
FIG. 13 is an illustration of a network configuration that can perform client-server authentication.

In this embodiment, a mesh network could be managed by a computing cloud 240. When a new multi-RAT node 210, 220, or 230 wishes to join the mesh network, it would have to establish a connection with the computing cloud 240 because the computing cloud 240 is managing the network. As a precursor for creating that connection, the new multi-RAT node 210, 220, or 230 would have to be authenticated. FIG. 13 illustrates a network configuration that could employ this SON embodiment.

In this embodiment, each of the multi-RAT nodes 1310, 1320, and 1330 have a SON module stored in a processor that enables the steps described herein. These multi-RAT nodes have the same functionality and architecture as described throughout this application for multi-RAT nodes with different reference numerals. Additionally, the computing cloud 1340 also has a SON module that allows it to perform its role in the steps herein described. Assume that multi-RAT nodes 1310 and 1320 are participating in a mesh network 1350. The computing cloud 1340 is managing some of the functionality of that mesh network 1350. In the event that multi-RAT node 1330 wishes to join the mesh network 1350 it could begin that process by transmitting information sufficient for either of the other multi-RAT nodes 1310 and 1320 to identify multi-RAT node 1330 as a multi-RAT node.

Upon receiving 410 multi-RAT node 1330's transmission, multi-RAT node 1220 could store 415 the environmental condition, i.e., an authentication request, evaluate 420 the request, and determine 430 that it will establish a client-server relationship with multi-RAT node 1330. Multi-RAT node 1320 could then connect to the computing cloud 1340 via a secure connection, for example a VPN connection.

Once multi-RAT node 1330 has a connection to the computing cloud 1340 through multi-RAT node 1320, it could notify the computing cloud 1340 that it would like to establish an independent connection with the computing cloud 1340. The computing cloud 1340 could then authenticate multi-RAT node 1330, thereby freeing up the resources of the multi-RAT nodes in the mesh network 1350. In this embodiment, after the computing cloud 1340 has authenticated multi-RAT node 1330, it could instruct multi-RAT nodes 1310 and 1320 about the steps they should take to add multi-RAT node 1330 to the mesh network 1330.

(10) Solving the "Hidden Node" Problem

In Wi-Fi communication networks, there is a design challenge called the "hidden node problem." In a Wi-Fi network, when an access point is transmitting, all of the nodes within its range can hear the transmission. This set-up has its benefits because when other nodes hear someone within the network transmitting, they do not transmit. When nodes do not hear another broadcast, they use that opportunity to transmit any information that may be in their queue to transmit. This same hidden node problem can occur in other wireless communication networks as well.

Figure 14A:
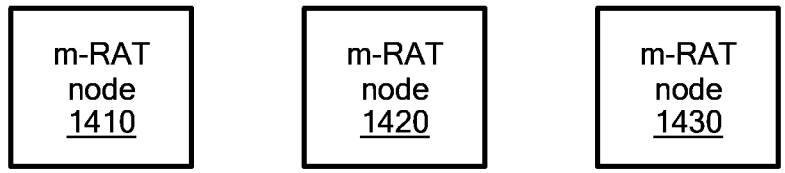
FIG. 14A illustrates a heterogeneous mesh network with a "hidden node" problem.
Figure 14B:
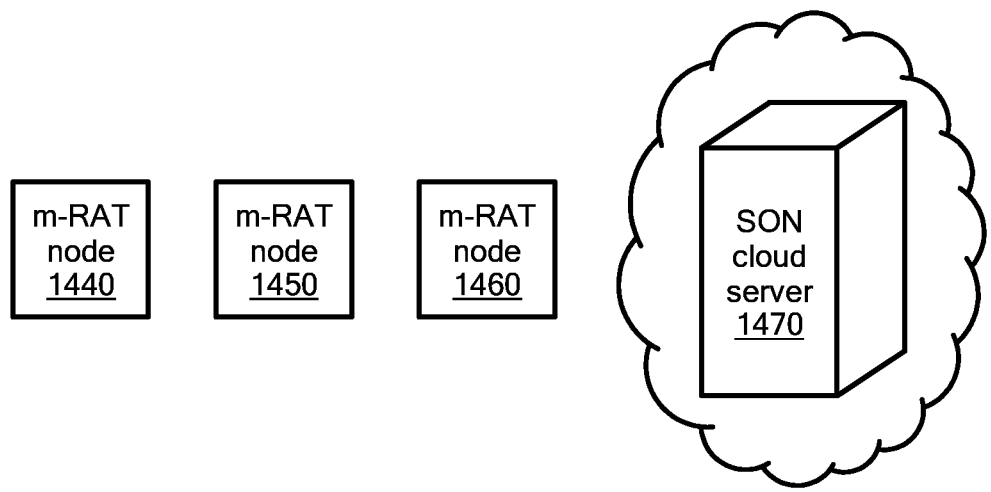
FIG. 14B illustrates how a SON module can overcome a "hidden node" problem.

FIG. 14A shows the "hidden node" problem, while FIG. 14B shows a SON solution for overcoming the problem. In this embodiment, the "hidden node" problem could be an environmental condition.

FIG. 14A shows a small communication network containing three Wi-Fi nodes 1410, 1420, and 1430. In this communication network, node 1420 is within the communication range of both node 1410 and node 1430. Nodes 1410 and 1430, however, are out of range of each other. In other words, node 1410 is hidden from node 1430's perspective, and vice versa. This is the "hidden node" problem. It is a problem because, if node 1410 begins broadcasting, node 1420 will hear the broadcast, while node 1430 will not hear the broadcast. From node 1430's perspective, the network is idle, which means that node 1430 can begin transmitting. If the transmissions from node 1410 and node 1430 overlap in time, node 1420 will not be able to receive any information from either node during the time in which their transmissions overlap. This will result in lost data, which is undesirable. This problem becomes much more insidious when the mesh network becomes larger.

In the SON embodiments of this invention, the hidden node problem can be overcome by sharing intelligence about the nodes within a particular network. In one embodiment, shown in FIG. 14B, the network could be comprised of three multi-RAT nodes 1440, 1450, 1460, and a computing cloud 1470 having a SON module. In this embodiment, each of the multi-RAT nodes 1440, 1450, and 1460 would send environmental conditions sufficient to identify its in-range neighbors. By way of example, multi-RAT node 1440 could report that it sees multi-RAT node 1450. Multi-RAT node 1450 could report that it sees multi-RAT nodes 1440 and 1460. And multi-RAT node 1460 could report that it sees multi-RAT node 1450. After receiving 410 these environmental conditions, the SON module within the computing cloud 1470 could store 415 and evaluate 420 the environmental conditions. The SON module in the computing cloud 1470 could then determine 430 that there was a hidden node problem and that an operational parameter should be changed 435.

In order to overcome the hidden node problem, the SON module in the computing cloud 1470 could coordinate changing 435 an operational parameter, such as transmission channel, by instructing one of the multi-RAT nodes 1440 or 1460 to change its channel. Alternatively, the SON module could alter routing tables by pruning routes or prioritizing routes. In an alternate embodiment, this SON module could be performed by multi-RAT nodes 1440, 1450, or 1460 within a mesh network by using distributed intelligence techniques to compile a joint list of who sees whom within the network. Once a "hidden node" problem is discovered, the SON module within the multi-RAT nodes 1440, 1450, or 1460 could have a set of default operational parameters, such as changing a channel, which could be performed.

The foregoing discussion discloses and describes merely exemplary embodiments of the present invention. In additional embodiments, the methods described herein can be stored on a computer readable medium such as a computer memory storage, a compact disk (CD), flash drive, optical drive, or the like. As will be understood by those skilled in the art, the present invention may be embodied in other specific forms without departing from the spirit or essential characteristics thereof. For example, wireless network topology can also apply to wired networks, optical networks, and the like. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology.

What is claimed is:

1. A wireless communication system having a self-organizing network orchestration architecture comprising:
   a first radio base station configured to provide access to one or more terminal devices via at least one of a first and a second radio access technology;
   a second radio base station configured to provide access to the one or more terminal devices via at least the first radio access technology; and
   a self-organizing network (SON) module in a computing cloud configured to receive an environmental condition from one of the first and the second radio base stations via a data path, and based on the received environmental condition, configured to send configuration information to either the first or the second radio base station via the data path to cause adjustment of operational parameters at either the first or the second radio base station,
   wherein the SON module is also configured to receive a second environmental condition from a core network via the data path,
   thereby enabling the SON module to receive real-time network information for network orchestration.

2. The wireless communication system of claim 1, wherein the environmental condition is an interference measurement, a capacity measurement, a spectrum efficiency measurement, a routing path, a network congestion measurement, a throughput measurement, a latency measurement, a coverage gap, a signal-to-noise ratio, a quality-of-service measurement, an available portion of spectrum, a load balancing measurement, a radio-bearer utilization value, a status of a heterogeneous mesh network, a status of a multi-radio access technology (RAT) node within a heterogeneous mesh network, identifying information of a multi-RAT node, a status of a wired connection within a heterogeneous mesh network, a frequency restriction, a signal strength measurement of a neighboring node, a request to join a heterogeneous mesh network, or an existence of a hidden node.

3. The wireless communication system of claim 1, wherein the environmental condition is a multi-radio access technology (RAT) node identification number, an identification number for software stored in a multi-RAT node, a security parameter, a location of a multi-RAT node, a configuration certificate of a multi-RAT node, an operating frequency, or a handoff request.

4. The wireless communication system of claim 1, wherein the environmental condition is a range from a user equipment to a multi-radio access technology (RAT) node, a travel direction of a user equipment, a travel speed of a user equipment, a signal strength of a user equipment, a location of a user equipment, a mapping application stored on a user equipment, or an operational channel.

5. The wireless communication system of claim 1, wherein the adjusted operational parameters include one or more of a power level, a channel, a sub-channel, a frequency band, a sub-carrier frequency, a spectrum allocation, an access configuration, a backhaul configuration, a client role, a server role, a self-configuration instance, a routing path, an IP address, a fully-qualified domain name, a dynamic host configuration protocol address, a network provider configuration, or a participation status within a heterogeneous mesh network.

6. The wireless communication system of claim 1, wherein the environmental condition is a request to establish a heterogeneous mesh network and the operational parameters include a dynamic host configuration protocol address.

7. The wireless communication system of claim 1, wherein the environmental condition is a request to join a heterogeneous mesh network and the operational parameters include a self-configuration instance, an IP address, an access configuration, or a backhaul configuration.

8. The wireless communication system of claim 1, wherein the environmental condition is a status of a wired connection within a heterogeneous mesh network and the operational parameters include a backhaul configuration.

9. The wireless communication system of claim 1, wherein the environmental condition is a capacity measurement and the operational parameters include an access configuration, a backhaul configuration, a network provider configuration, or a frequency band.

10. The wireless communication system of claim 1, wherein the environmental condition is a capacity measurement, a quality of service measurement, or a spectrum efficiency measurement and the operational parameters include a frequency band.

11. The wireless communication system of claim 1, wherein the environmental condition is a location or a signal strength measurement for a user equipment within a heterogeneous mesh network and the operational parameters include a channel, a sub-channel, or a sub-frequency carrier.

12. The wireless communication system of claim 1, wherein the environmental condition is an existence of a hidden node and the operational parameters include a channel.

13. The wireless communication system of claim 1, wherein the environmental condition is a third-party environmental condition or a third-party operational parameter.

* * * * *